US009309967B2

United States Patent
Iida et al.

(10) Patent No.: US 9,309,967 B2
(45) Date of Patent: Apr. 12, 2016

(54) GEARSHIFT MECHANISM AND WORKING VEHICLE

(71) Applicant: YANMAR CO., LTD., Osaka (JP)

(72) Inventors: Keisuke Iida, Osaka (JP); Masahiro Hanafusa, Osaka (JP); Taihei Daiyakuji, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 14/387,424

(22) PCT Filed: Oct. 29, 2013

(86) PCT No.: PCT/JP2013/079299
§ 371 (c)(1),
(2) Date: Sep. 23, 2014

(87) PCT Pub. No.: WO2014/069472
PCT Pub. Date: May 8, 2014

(65) Prior Publication Data
US 2015/0260283 A1    Sep. 17, 2015

(30) Foreign Application Priority Data

Oct. 30, 2012    (JP) ................................. 2012-239157

(51) Int. Cl.
*B60K 20/04*    (2006.01)
*B60K 23/00*    (2006.01)
(Continued)

(52) U.S. Cl.
CPC ................ *F16H 61/26* (2013.01); *B60K 20/00* (2013.01); *B60K 20/02* (2013.01); *B60K 20/04* (2013.01);
(Continued)

(58) Field of Classification Search
CPC ................... Y10T 74/20061; Y10T 74/20055; Y10T 74/20018; Y10T 74/20189; Y10T 74/20528; Y10T 74/20213; Y10T 74/20888; Y10T 74/20207; F16H 59/06; F16H 59/04; B60K 23/00; G05G 1/46; G05G 1/36; G05G 1/30; G05G 1/01; G05G 11/00
USPC .......... 74/473.17, 473.16, 473.1, 512, 480 R, 74/479.01, 483 R; 180/336
See application file for complete search history.

(56) References Cited

U.S. PATENT DOCUMENTS 3,412,627 A * 11/1968 Goodacre .............. B60K 41/04
74/483 R
3,525,266 A * 8/1970 Brooks .................... F16H 61/42
74/470
(Continued)

FOREIGN PATENT DOCUMENTS

CA    2409173 A1 * 4/2004 ............. F16H 59/06
DE    2618708 A1 * 11/1977 ............. B60K 26/02
(Continued)

*Primary Examiner* — Keith Frisby
(74) *Attorney, Agent, or Firm* — Jordan and Hamburg LLP

(57) ABSTRACT

A gear shift mechanism in which operability of an operation pedals for steplessly changing gears in both forward and reverse direction, and a vehicle with the gearshift mechanism. This gearshift mechanism includes a gearshift shaft to which a pedal boss is fitted that is located on the base end side of a pedal arm of a forward pedal, an intermediate link that is connected to a pedal boss that is located on the base end side of a pedal arm of a reverse pedal via a connection member, and a link shaft to which a link boss of the intermediate link is fitted. the pedal boss of the forward pedal is fixed to the gearshift shaft and the pedal boss is unable to rotate relatively to the gearshift shaft, which a pedal boss located on the right side of the pedal boss is able to rotate relatively to the gearshift shaft.

7 Claims, 17 Drawing Sheets

(51) Int. Cl.
*B60K 26/02* (2006.01)
*F16H 59/06* (2006.01)
*G05G 11/00* (2006.01)
*G05G 1/46* (2008.04)
*G05G 1/36* (2008.04)
*G05G 1/01* (2008.04)
*F16H 61/26* (2006.01)
*E02F 9/20* (2006.01)
*B60K 20/00* (2006.01)
*B60K 20/02* (2006.01)
*B62D 49/06* (2006.01)
*F16H 59/02* (2006.01)

(52) U.S. Cl.
CPC .......... *B62D 49/0692* (2013.01); *E02F 9/2004* (2013.01); *F16H 59/0208* (2013.01); *F16H 59/06* (2013.01); *G05G 1/01* (2013.01); *G05G 1/36* (2013.01); *G05G 1/46* (2013.01); *G05G 11/00* (2013.01); *B60K 23/00* (2013.01); *B60Y 2200/221* (2013.01); *F16H 2059/0234* (2013.01); *F16H 2059/0295* (2013.01); *Y10T 74/20061* (2015.01); *Y10T 74/20189* (2015.01); *Y10T 74/20213* (2015.01); *Y10T 74/20528* (2015.01); *Y10T 74/20888* (2015.01)

(56) References Cited

U.S. PATENT DOCUMENTS

| | | | | |
|---|---|---|---|---|
| 3,691,863 A * | 9/1972 | Shaffer | ................ | B60K 26/00 192/98 |
| 3,722,314 A * | 3/1973 | Sorenson | ................ | F16H 59/06 180/336 |
| 3,823,792 A * | 7/1974 | Dinkloh | ................ | B60K 17/10 180/14.3 |
| 3,943,712 A * | 3/1976 | Stuhr | ................ | B60K 23/00 60/327 |
| 3,995,510 A * | 12/1976 | Yost | ................ | B60K 23/00 180/335 |
| 4,129,047 A * | 12/1978 | Dornan | ................ | B60K 23/00 192/98 |
| 4,883,137 A * | 11/1989 | Wanie | ................ | B60K 20/00 180/273 |
| 5,022,477 A * | 6/1991 | Wanie | ................ | B60K 20/00 180/336 |
| 5,842,378 A * | 12/1998 | Zellmer | ................ | B60K 23/00 74/473.17 |
| 6,233,931 B1 * | 5/2001 | Matsufuji | ................ | B60K 17/04 60/487 |
| 6,237,711 B1 * | 5/2001 | Hunt | ................ | B60W 30/18 180/315 |
| 6,904,985 B2 * | 6/2005 | Ferree | ................ | B60K 17/10 180/6.32 |
| 7,900,737 B2 * | 3/2011 | Isogai | ................ | B60K 17/10 180/305 |
| 8,132,591 B2 | 3/2012 | Nishino | | |
| 8,157,042 B2 * | 4/2012 | Fujiki | ................ | A01B 51/026 180/312 |
| 2001/0011610 A1 * | 8/2001 | Teal | ................ | B26D 11/183 180/6.2 |
| 2003/0075378 A1 * | 4/2003 | Sprinkle | ................ | F16H 61/47 180/321 |
| 2005/0115760 A1 * | 6/2005 | Sprinkle | ................ | F16H 61/47 180/338 |
| 2006/0090442 A1 * | 5/2006 | Komiya | ................ | A01D 34/64 56/14.7 |
| 2008/0028882 A1 * | 2/2008 | Sakamoto | ................ | F16H 59/06 74/473.17 |
| 2008/0238153 A1 | 10/2008 | Nishino | | |
| 2009/0126528 A1 * | 5/2009 | Sakamoto | ................ | E02F 3/964 74/594.4 |

FOREIGN PATENT DOCUMENTS

| | | | | |
|---|---|---|---|---|
| GB | 1370771 A | * | 10/1974 | ............ B60K 41/04 |
| JP | 01-257634 | | 10/1989 | |
| JP | 01262227 A | * | 10/1989 | |
| JP | 01311920 A | * | 12/1989 | |
| JP | 02-68228 | | 3/1990 | |
| JP | 02068227 A | * | 3/1990 | |
| JP | 02074418 A | * | 3/1990 | |
| JP | 2002114051 A | * | 4/2002 | |
| JP | 2007-030625 | | 2/2007 | |
| JP | 2008-183965 | * | 8/2008 | |
| JP | 2008-245609 | | 10/2008 | |
| JP | 2009-132309 | | 6/2009 | |
| JP | 2009132309 A | * | 6/2009 | |
| JP | 2009-262668 | | 11/2009 | |
| JP | 2010-182126 | | 8/2010 | |
| JP | 2010-280284 | * | 12/2010 | |
| KR | 2007-055947 | * | 5/2007 | |
| KR | 20090080263 A | * | 7/2009 | |

* cited by examiner

GEARSHIFT MECHANISM AND WORKING VEHICLE

BACKGROUND OF THE INVENTION

The present invention relates to a gearshift mechanism comprising a first pedal that regulates forward direction of rotative power that is output by a continuously variable transmission that transmits power of an engine, and a second pedal that varies reverse direction of rotative power that is output by the continuously variable transmission. The present invention also relates to a working vehicle with the gearshift mechanism. As a working vehicle, for example, it includes tractors used for agricultural work or wheel loaders used for construction work etc.

Conventionally, for working vehicles such as tractors or wheel loaders etc., disclosed is a working vehicle comprising a hydrostatic continuously variable transmission that steplessly changes gears of engine power forward and rearward, and a mission case that transmits power from the hydrostatic continuously variable transmission by gear-changing (see Patent Document 1). Also, the working vehicle disclosed in the Patent Document 1 is comprised of a change pedal that is link-coordinated to a shift shaft (a trunnion shaft) of a continuously variable transmission, wherein the operation of a forward pedal and a reverse pedal that are equipped on the change pedal controls backward and forward speed of a vehicle.

CITATION LIST

Patent Document 1: JP 2008-245609A

As in the Patent Document 1, when each forward pedal and reverse pedal are longitudinally arranged of a trunnion shaft along the moving direction of a working vehicle, the reverse pedal located on the rear side is located under foot of a driver. Therefore, an operator sitting on the working vehicle has trouble figuring out the position of a reverse pedal, unlike a forward pedal. Additionally, since all pedals except for a reverse pedal, including a forward pedal, are located in front, a reverse pedal being different in positional relationship with other pedals, its operability had been a problem.

SUMMARY OF THE INVENTION

Then, the present invention aims at intending to provide a gearshift mechanism in which the operability of operation pedals for steplessly changing gears in both forward and reverse direction is improved, and a vehicle with the gearshift mechanism.

In order to accomplish the objective, a gearshift mechanism of the invention is comprised of:

a first pedal varying forward direction of rotative power output from a continuously variable transmission that transmits power of an engine;

a second pedal varying reverse direction of rotative power output from the continuously variable transmission;

a gearshift shaft, to which fits a base end side of the second pedal that is located in a way that the second pedal can be operated in the same direction as the first pedal, being a rotating shaft of the first pedal whose base end side is fixed;

an intermediate link, which abuts against the base end side of the first pedal and rotates in a direction opposite to movement of the first pedal, being connected to the second pedal and rotating in the same direction as the second pedal;

a link shaft, which is located parallel to the gearshift shaft, fits to the intermediate link; and a frame body pivotally supporting the gearshift shaft and the link shaft, wherein an end portion of the gearshift shaft is connected to a link mechanism that is connected to the continuously variable transmission, the second pedal and the intermediate link are relatively rotatable to the gearshift shaft and the link shaft respectively, when the first pedal is operated, the gearshift shaft rotates in the same direction as the first pedal and the forward direction of rotative power from the continuously variable transmission is varied, and when the second pedal is operated, the intermediate link rotates in the same direction as the second pedal, then the intermediate link pushes the base end side of the first pedal, then the first pedal rotates in a direction opposite to the second pedal along with the gearshift shaft, and then the reverse direction of rotative power from the continuously variable transmission is varied.

According to the present invention, there is provided a gearshift mechanism, wherein the intermediate link has a cam face pushes the first pedal, and the first pedal abuts against the cam face of the intermediate link and has a bearing that rotates in accordance with the push of the cam face.

According to the present invention, there is provided the gearshift mechanism of further comprising a shock absorber, which is located in parallel with the moving direction of the link mechanism, absorbing a load input to the gearshift shaft from the link mechanism.

According to the present invention, a working vehicle comprises:

a vehicular body equipped with wheels for moving;

an engine mounted on the vehicular body;

a continuously variable transmission shifting power from the engine; and a gearshift mechanism, wherein the rotative power of the continuously variable transmission is varied by operation to the gearshift mechanism.

According to the invention related to claim 1, the first pedal and the second pedal can be located next to each other, letting the first pedal and the second pedal operatable in the same direction by locating an intermediate link to rotate the gearshift shaft in the direction opposite to the rotational direction of the second pedal. Therefore, its operability is improved compared to the prior operation mechanism. Improving the operability, accidents caused by an operator's incorrect operation can be prevented.

According to the invention, the rotation of the second pedal drives the first pedal in the direction opposite to the second pedal using a small amount of parts by providing the cam face on the intermediate link and by providing the bearing as a driven member on the first pedal. Therefore, the gearshift mechanism can be made smaller.

According to the invention, the shock absorber prevents the first pedal and the second pedal from rapidly returning to the neutral position, preventing a rapid change of an operating condition, and then an operator's danger can be prevented.

According to the invention, the gearshift mechanism enables the first pedal and the second pedal to be operated in the same direction. Therefore, not only the operability of moving forward and moving backward of the working vehicle can be improved, but also accidents caused by an operator's incorrect operation can be prevented.

DESCRIPTION OF THE PREFERRED EMBODIMENTS

Figure 1:
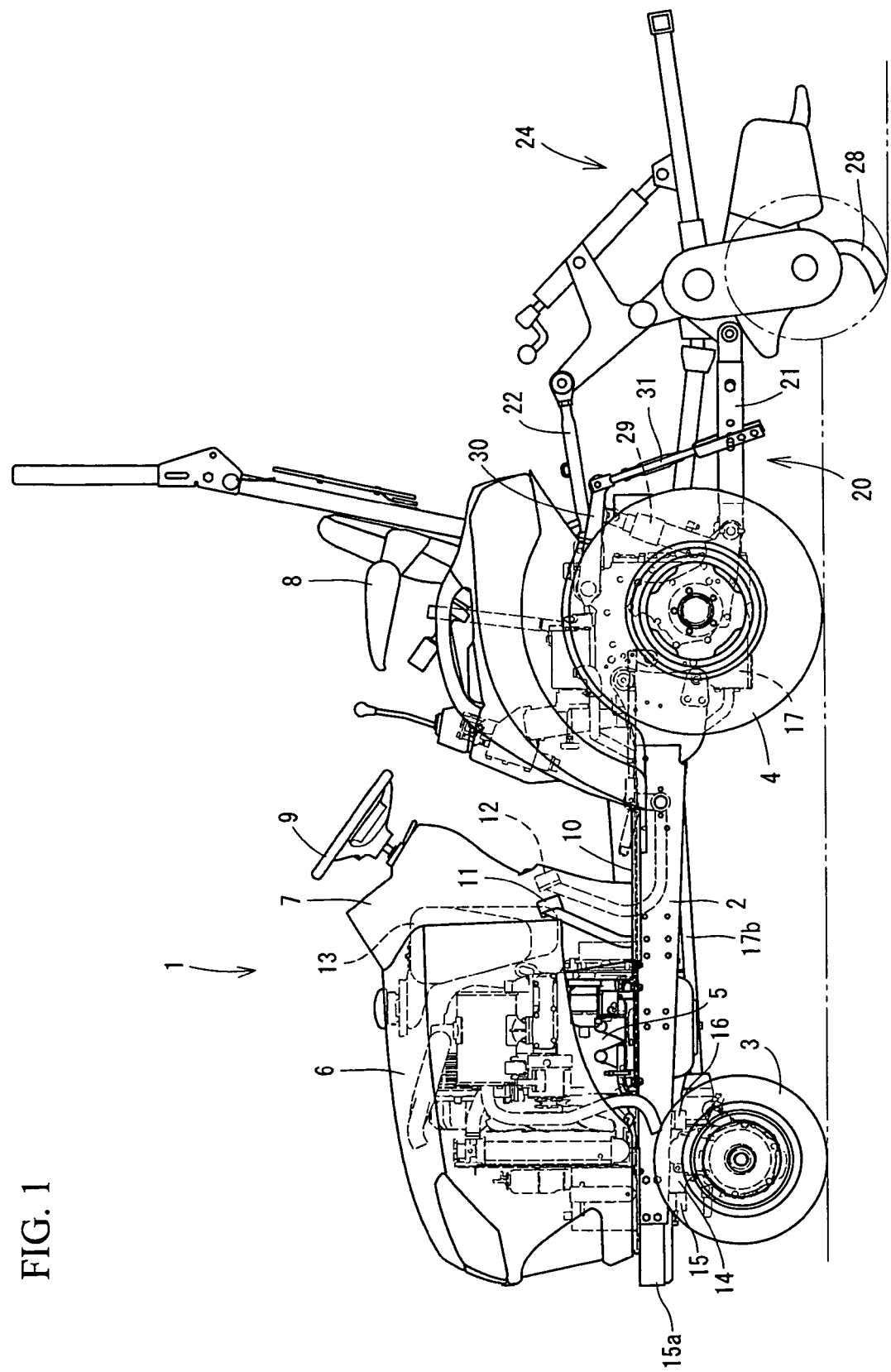
FIG. 1 is a side view of a tractor for agricultural work.
Figure 2:
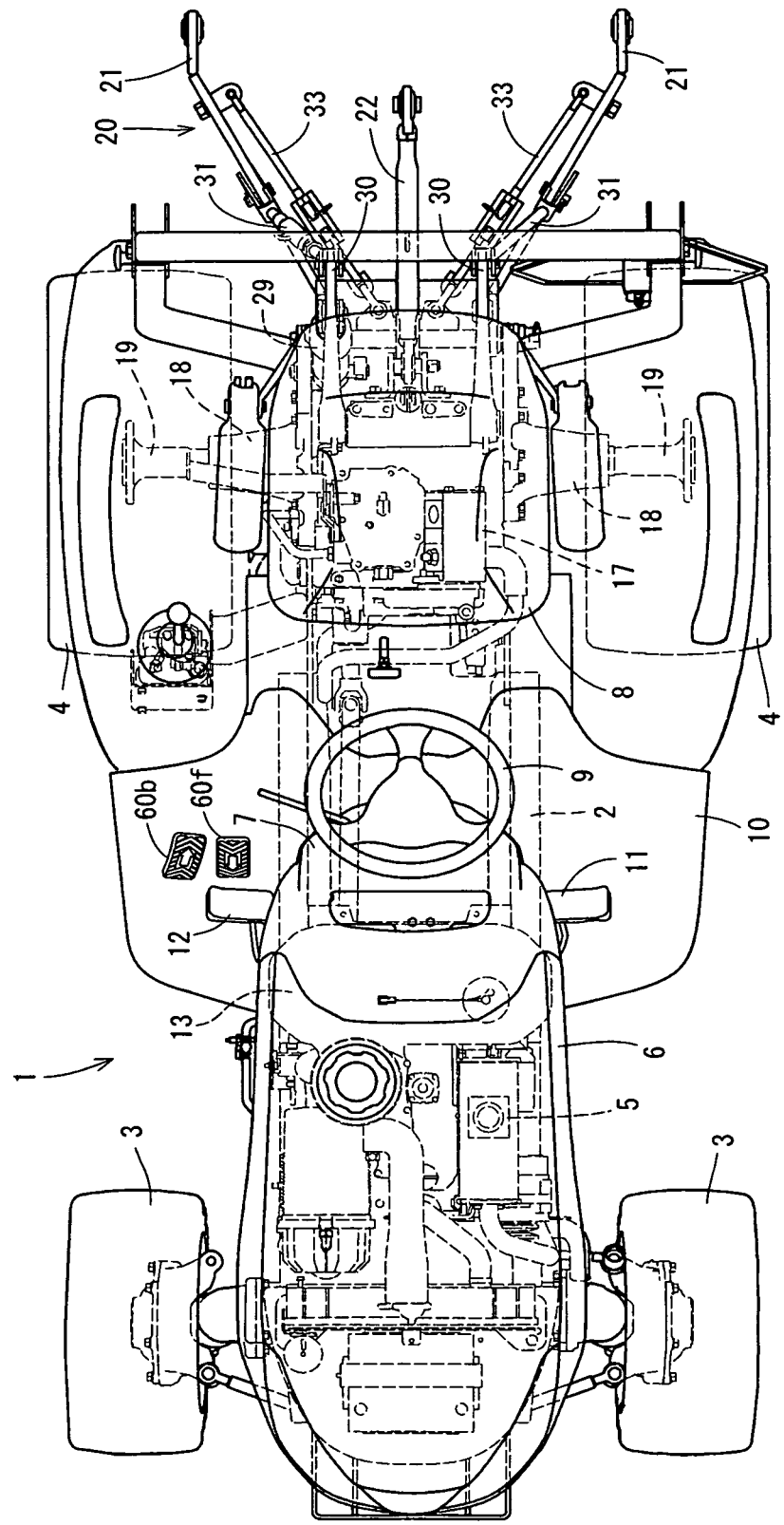
FIG. 2 is a plan view of the tractor for agricultural work.
Figure 3:
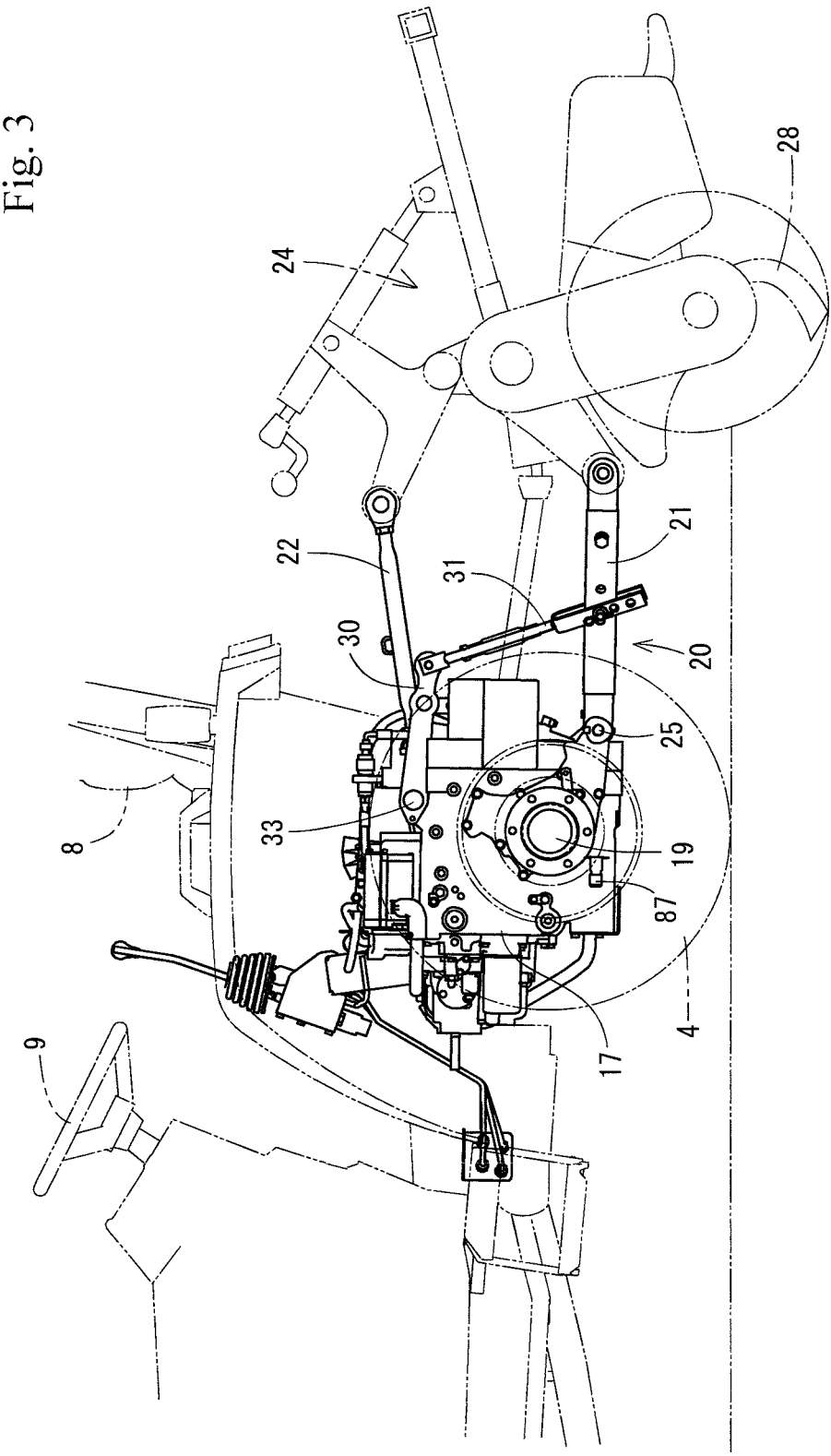
FIG. 3 is a left side explanation view of a mission case.
Figure 4:
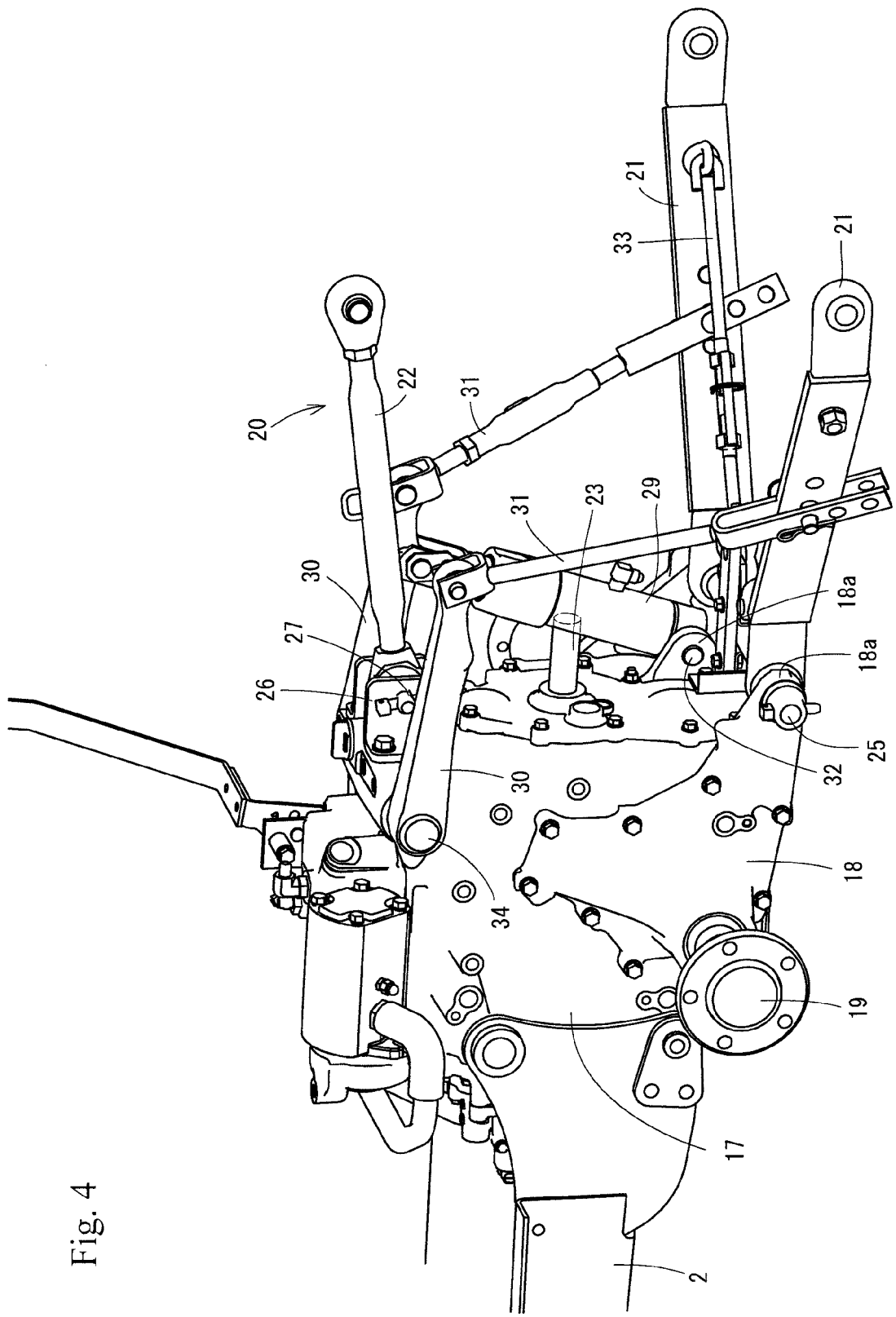
FIG. 4 is a diagrammatic perspective view of the mission case seen from backward left side.
Figure 5:
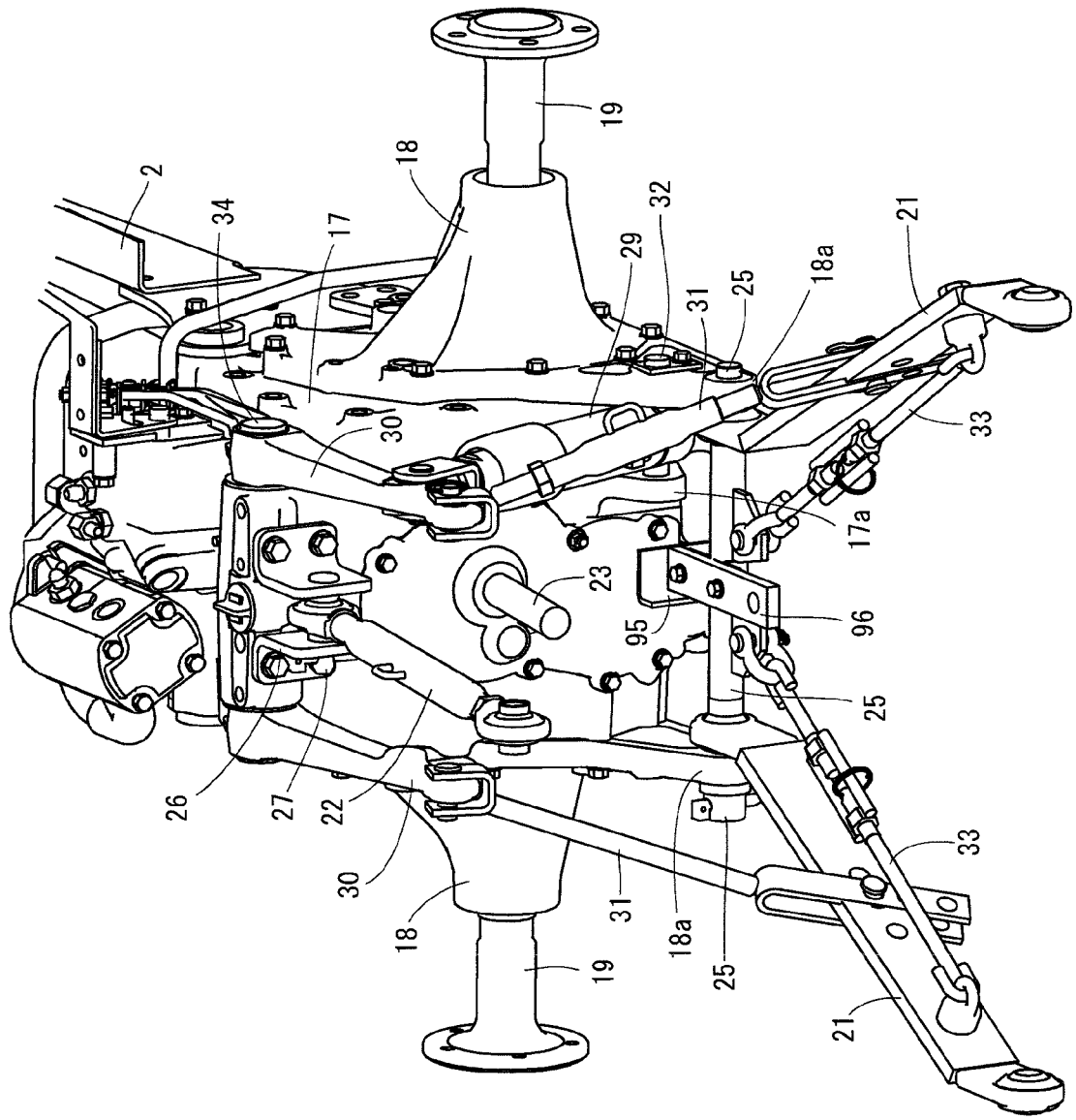
FIG. 5 is a diagrammatic perspective view of the mission case seen from right backward.

Next is the explanation based on the drawings (FIGS. 1 to 10) when an embodiment of the invention of the application is applied to a tractor for agricultural work as a working vehicle. As shown in the FIGS. 1 to 5, a tractor 1 sustains a vehicular body 2 by a pair of right and left front wheels 3 and a pair of right and left rear wheels 4. Moreover, in the following explanation, the left side when facing the moving direction of the vehicular body 1 is simply called left side, likewise the right side when facing the moving direction is simply called right side. An engine 5 mounted on the front of the vehicular body 2 drives a pair of right and left rear wheels 4 (front wheels 3) for moving forward or backward. The engine 5 is covered by a hood 6. A fuel tank 13 is installed inside of the rear portion of the hood 6.

Moreover, a steering column 7 is located on a rear portion of the hood 6. A control steering wheel 9 is provided that steers the right and left front wheels 3 to the right and left. The control steering wheel 9 is located on the steering column 7. A control seat 8 is located at the back of the control steering wheel 9, on the upper surface of the vehicular body 2. A step 10 with which an operator board is located at the bottom of the steering column 7. A clutch pedal 11 is located on the left side of the steering column 7 on the upper surface of the step 10. A brake pedal 12 as a braking operation tool, a forward pedal 60f (first pedal) and a reverse pedal 60b (second pedal) as gearshift tools are located on the right side of the steering column 7 on the upper surface of the step 10. An operator sitting on the control seat 8 grips the control steering wheel 9, and steps on the clutch pedal 11, the brake pedal 12, the forward pedal 60f, or the reverse pedal 60b to operate.

Anterior to the vehicular body 2, provided was a front axle case 14 that is connected to a front wheel transmission shaft 17b located on the bottom front surface of a mission case 17. By so doing, the rotation of the mission case 17 is transmitted to the right and left front axles 35 (see FIG. 16) that is inserted into the front axle case 14, via a front wheel transmission axle (not expressed with a figure) that is inserted into the front wheel transmission shaft 17b, and then the right and left front wheels 3 are rotated. Moreover, the front axle case 14 is pivotally supported in a way that can be tilted to the right and left of the vehicular body 2 by being put between a front side support 15 integral with a front bumper 15a, and a rear side support 16 fixed on the vehicular body 2 along with the front side support 15.

On the rear portion of the vehicular body 2 provided is the mission case 17 for transmitting the rotation of the engine 5 to the right and left rear wheels 4 (front wheels 3) with changing the speed of the rotation. Right and left rear axle cases 18 are protruded outward from right and left outside surface of the mission case 17. Right and left rear axles 19 are interpolated into the right and left rear axle cases 18. The rear wheels 4 are installed to the mission case 17 via the rear axle 19, and the rear wheels 4 are driven forward or reverse.

Furthermore, on the rear side surface of the mission case 17, a rear side Power Take-Off (PTO) shaft 23 for transmitting PTO drive power rearward is protruded rearward. A three-point link mechanism 20 is provided that connects a rotary cultivator 24 as a ground working machine and the rear portion of the vehicular body 2. The three-point link mechanism 20 is formed by a pair of right and left lower links 21 and a top link 22. The front end side of the right and left lower links 21 are connected to a hitch portion 18a of the rear end portion of the right and left rear axle cases 18 in a rotatable manner via a lower link pin 25. The front end side of the top link 22 is connected to a link hitch 26 of the rear side surface of the mission case 17 via a top link pin 27. The front end side of check chains 33 that regulate right and left oscillation of the lower links 21 are connected to an intermediate portion of the lower link pin 25 (see the FIG. 9).

Moreover, the PTO shaft 23 for driving the rotary cultivator 24 is protruded rearward, on the rear side surface of the mission case 17. Using the three-point link mechanism composed of the pair of right and left lower links 21 and the top link 22, the tractor 1 pulls the rotary cultivator 24, a rotary tillage tine 28 of the rotary cultivator 24 is rotated by the power from the PTO shaft 23, and cultivating work in a field is executed.

As an actuator, a single lifting hydraulic cylinder 29 is provided that lifts the link mechanism 20. Right and left lift arms 30 are provided in rotatable manner on upper portion of the mission case 17 via a lift arm axle 34, and the right and left lower links 21 are connected to each of the lift arms 30 via lift rods 31. A piston rod of the lifting hydraulic cylinder 29 is connected to the right side of the lift arm 30. Actuating the lifting hydraulic cylinder 29, its piston rod goes in and out, rotating the end side of the right and left lift arms 30 up and down. Then the rear end side of the lower link 21 is vertically rotated having the lower link pin 25 as a fulcrum point, and the rotary cultivator 24 that is connected to the rear end side of the lower link 21 is lifted. Moreover, the lifting hydraulic cylinder 29 is supported by a bracket portion 17a integral with the rear surface of the mission case and a hitch portion 18a integral with the rear end portion of the right and left rear axle case 18, via a cylinder support pin 32 (see the FIG. 9).

Next, referring to the FIGS. 6 to 10, an inner structure of the mission case 17 will be explained. The mission case 17 is comprised of a main body case 43 in which a vehicular brake 41 mechanism and a differential mechanism 42 are arranged, a front surface side of lid body 44 that is fixed in a removable manner on the front surface side of the main body case 43, and a rear surface side of lid body 45 that is fixed in a removable manner on the rear surface side of the main body case 43. A planetary gear mechanism 47 and a continuously variable transmission 46 comprising a hydraulic pump (not expressed with a figure) and a hydraulic motor (not expressed with a figure) are located on the front surface side of lid body 44.

Regarding the continuously variable transmission 46, a shift shaft 78 that connects to a movable swash plate (not expressed with a figure) of the hydraulic pump or the hydraulic motor and changes angles thereof is protruded from the side surface of the continuously variable transmission 46. A gearshift arm 79 is connected to the shift shaft 78 in a way that the gearshift arm 79 is unable to rotate relatively to the shift shaft 78, and is connected to a gearshift mechanism 60 comprising the forward pedal 60f and the reverse pedal 60b via a gearshift rod 80.

The power of the engine 5 is transmitted to a shift output shaft 48 via the continuously variable transmission 46 and the planetary gear mechanism 47, and is further transmitted from the shift output shaft 48 to a vehicular brake shaft 50 via a bevel gear mechanism 49 for deceleration. Moreover, as shown in the FIGS. 6 and 10, the vehicular brake 41 mechanism is comprised of a brake shoe 41a, a brake operation plate 51, and a brake operation shaft 52 as a brake operation shaft. A pressure plate 51 is connected to the brake operation shaft 52 via a brake cam body 52a, and the brake pedal 12 is connected to a brake operation link 53 on the brake operation shaft 52 via a brake operation rod 54. A stepping operation of the brake pedal 12 crimps the brake shoe 41a by the brake cam body 52a, and puts a brake on the vehicular brake shaft 50.

As shown in the FIGS. 6 to 8, and 10, the differential mechanism 42 is comprised of a link gear 61 that connects to the vehicular brake shaft 50, a frame body 62 that is fixed to the link gear 61, right and left side gears 63 that are located in the frame body 62, and a pinion gear 64 that connects the right and left side gears 63. The right and left side gears 63 are pivotally engaged to the right and left rear axles 19. The travel shift output transmitted to the vehicular brake shaft 50 differentially rotates the right and left rear axles 19 via the differential mechanism 42, and the right and left rear wheels 4 are differentially rotated.

Moreover, the differential mechanism 42 is comprised of a diff-lock pin 65 that locks the side gears 63 to the frame body 62, a diff-lock shifter 66 comprising the diff-lock pin 65, a diff-lock fork 67 as a lock pin disengagement mechanism that slides the diff-lock shifter 66 on the rear axles 19, and a diff-lock shaft 68 that pivotally supports a fork boss portion 67a of the diff-lock fork 67 in a slidable manner. Both right and left end portion of the diff-lock shaft 68 are supported to right and left bearing portion 18b of the rear axle cases 18 (inside of the mission case 17) in a manner of slidable fashion in right and left direction. On the portion of the side surface of the frame body 62 that faces the side surface where the link gear 61 is located, the diff-lock shifter 66 is located in a way that the diff-lock shifter 66 slides in right and left direction. The diff-lock shifter 66 is pivotally supported in the state of being loosely fitted on the shaft centerline of the rear axles 19 via the frame body 62. The forefront side of the diff-lock pin 65 is constructed in the frame body 62 in a way that the forefront side of the diff-lock pin 65 goes in and out freely, a diff-lock notch 63a is formed on the periphery of the side gear 63 that oppose to the diff-lock pin 65, the forefront side of the diff-lock pin 65 is formed on the diff-lock notch 63a in a way that the forefront side of the diff-lock pin 65 can go in and out, and the diff-lock pin 65 is constructed on the side gear 63 in a detachable manner.

Furthermore, there is provided a diff-lock spring 71 as a buffer means that engages the diff-lock pin 65 to the diff-lock notch 63a, and a lock release spring 72 that releases the diff-lock pin 65 from the diff-lock notch 63a. A spring washer 73 is fixed to the left side end potion of the diff-lock shaft 68. The diff-lock spring 71 is wrapped around the periphery of the diff-lock shaft 68 between the spring washer 73 and the fork boss portion 67a of the diff-lock fork 67.

Moreover, a cylindrical brake interlock body 74 is fit to the right side end portion of the diff-lock shaft 68 in a way that the cylindrical brake interlock body 74 can slide in right and left direction. The right side end surface of the brake interlock body 74 abuts against the right side of the bearing portion 18b. On the other hand, the lock release spring 72 is wrapped around the periphery of the diff-lock shaft 68 between the left side end surface of the brake interlock body 74 and the fork boss portion 67a of the diff-lock fork 67.

Figure 7:
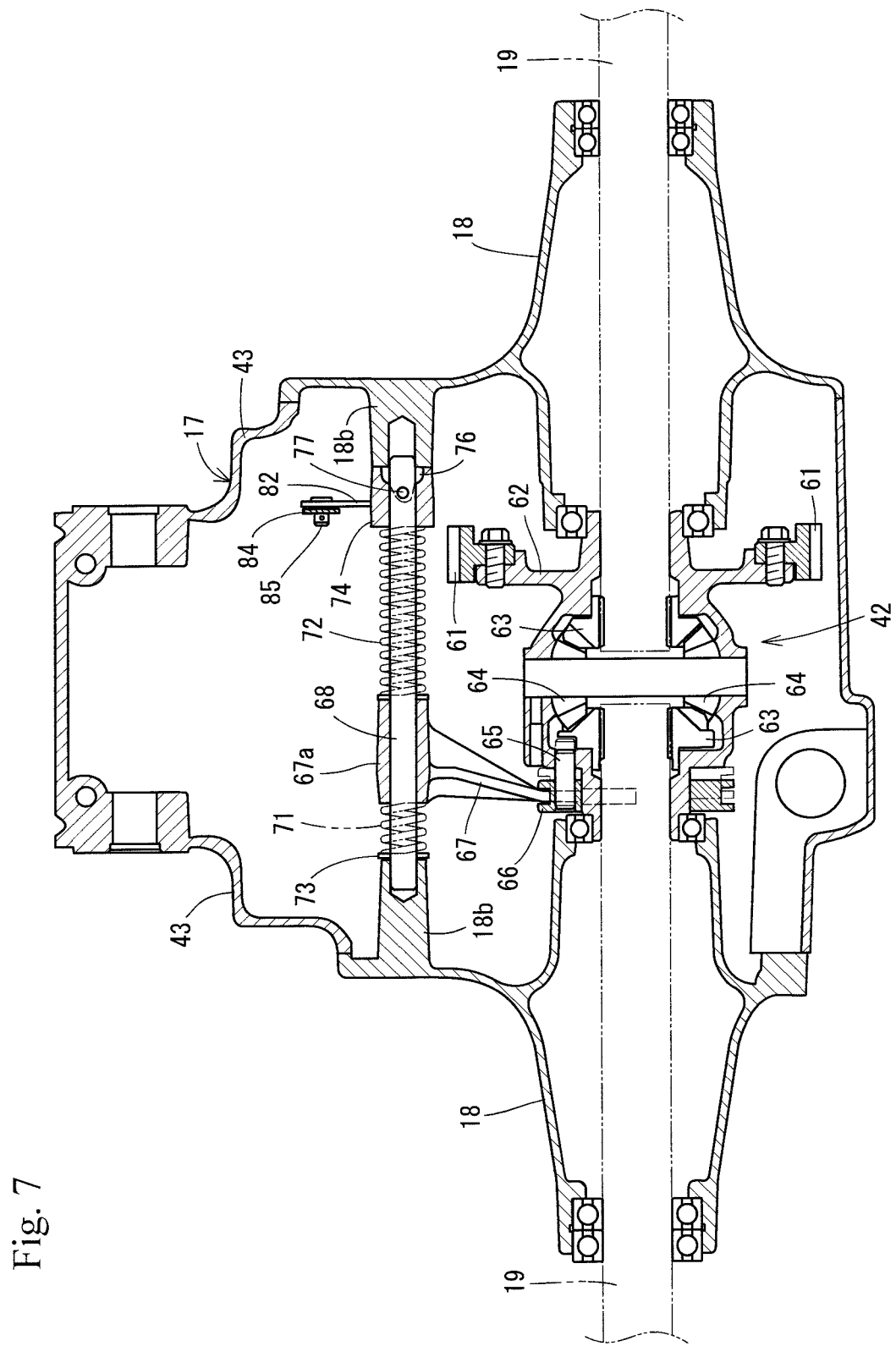
FIG. 7 is a backward cross-section view of the mission case.
Figure 8:
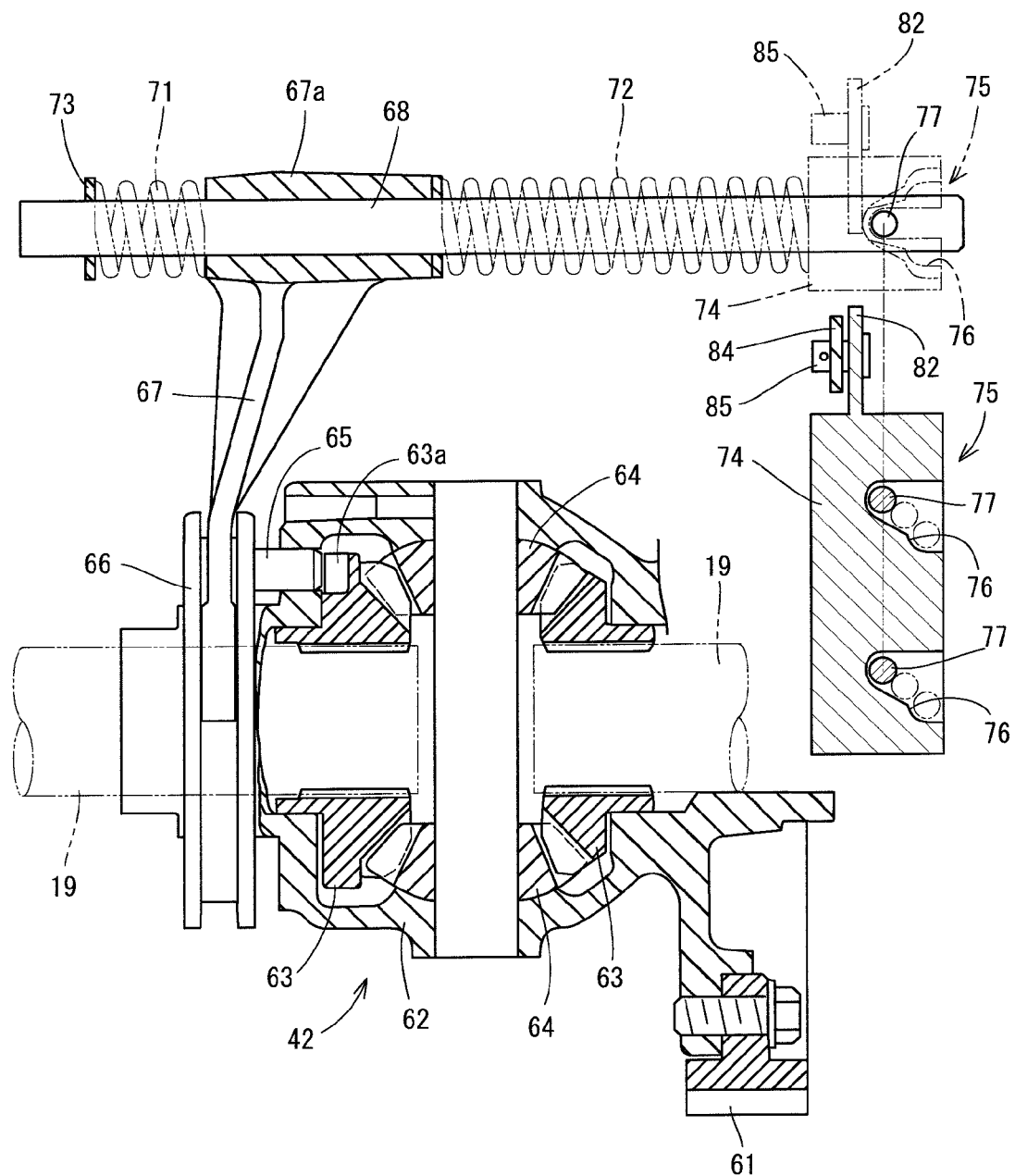
FIG. 8 is an enlarged explanation view of the FIG. 7.

As shown in the FIGS. 7 and 8, as a brake interlock means that connects the diff-lock pin 65 to the brake pedal 12 via the diff-lock spring 71, provided is a cam mechanism 75 that converts rotative force into slide force. The cam mechanism 75 is comprised of a cam groove 76 that is formed on the shaft hole of the brake interlock body 74, and a cam follower pin 77 that penetrates through the right side end portion of the diff-lock shaft 68. Both end side of the cam follower pin 77 that are protruded to the periphery of the diff-lock shaft 68 abut against a pair of cam groove 76 that are formed at the symmetry position.

Figure 6:
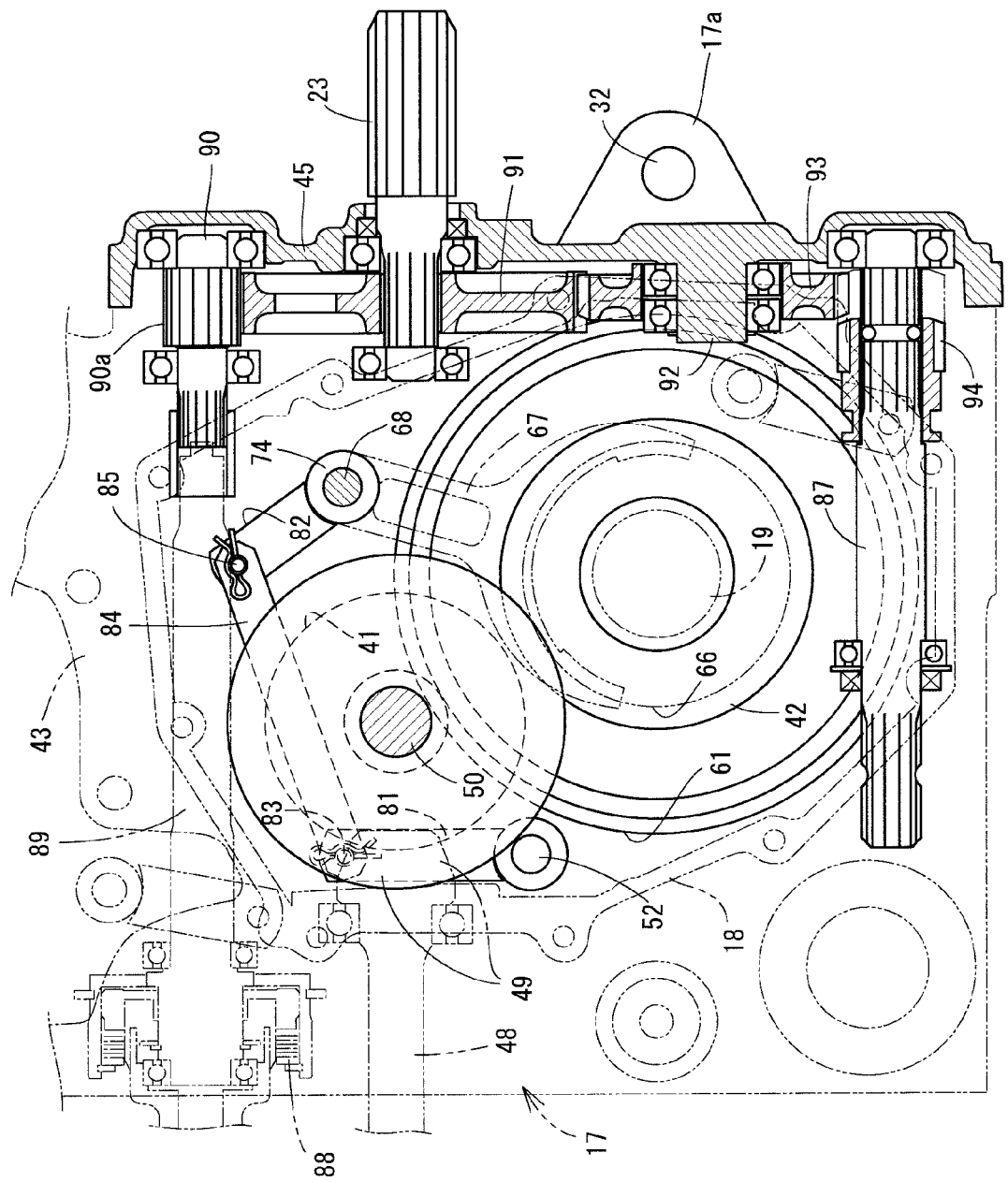
FIG. 6 is a left side cross-section view of the mission case.
Figure 10:
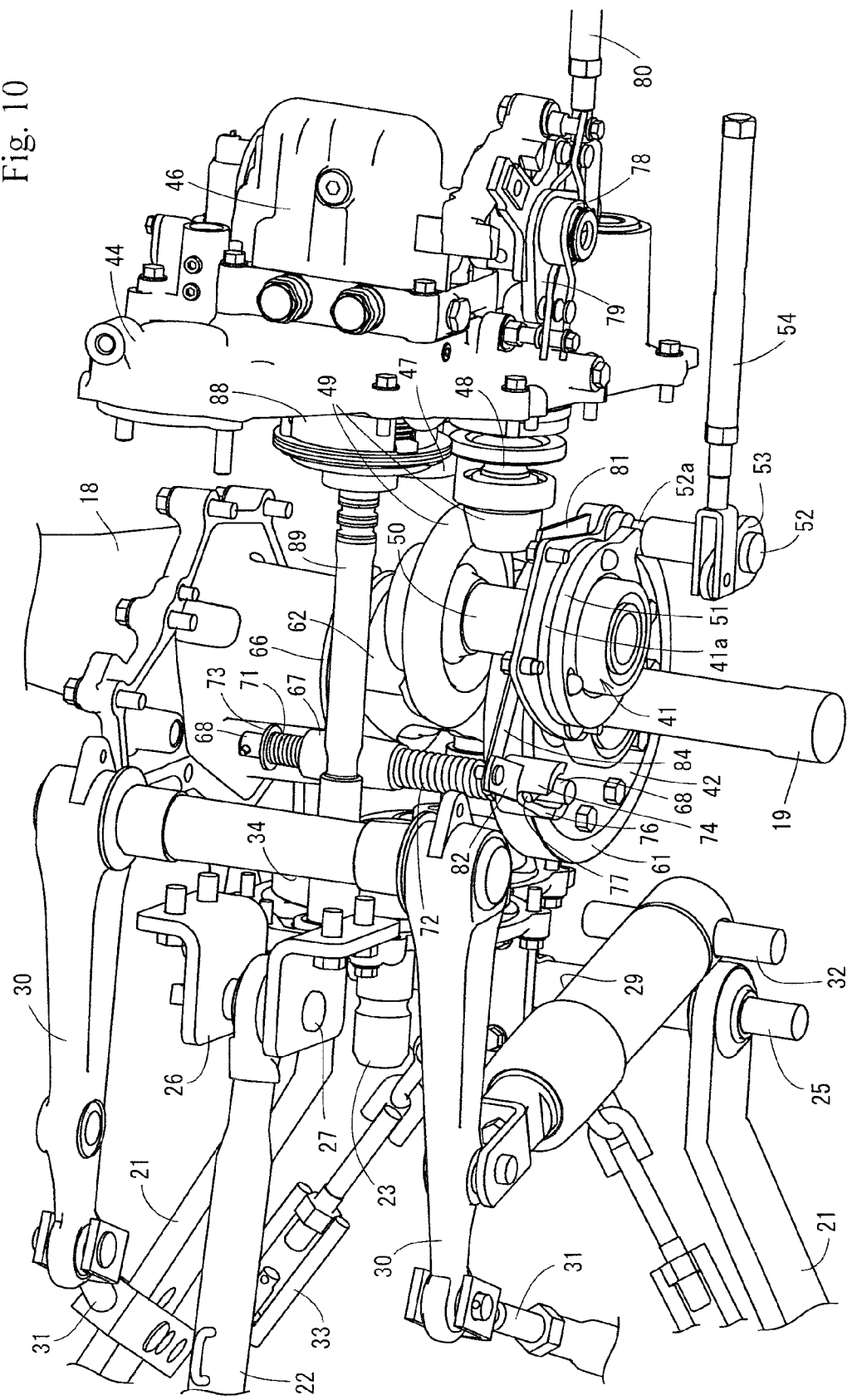
FIG. 10 is a diagrammatic perspective view of the mission case portion seen from right upper surface.

As shown in the FIGS. 6, 8, and 10, an interlock arm 81 is provided on the brake operation shaft 52, and a lock arm 82 is provided on the diff-lock shaft 68. One end side of a diff-lock operation link 84 is connected to the interlock arm 81 via a pin 83, and the other end side of the diff-lock operation link 84 is connected to the lock arm 82 via a pin 85. The brake interlock body 74 is connected to the brake pedal 12 via the interlock arm 81, the lock arm 82, and the diff-lock operation link 84.

According to the arrangement mentioned above, when the brake pedal 12 is not stepped on, in other words, when the vehicular brake 41 (right and left rear wheels 4) is kept in non-braking condition, the diff-lock fork 67 is slid towards the left side by the elastic force of the lock release spring 72, the diff-lock pin 65 is kept off from the diff-lock notch 63a of the side gear 63, and the differential mechanism 42 works and differentially drives the right and left rear wheels 4. On the other hand, when an operator steps on the brake pedal 12, the vehicular brake 41 is actuated in braking condition, the right and left rear wheels 4 are braked, while the brake interlock body 74 rotates around the diff-lock shaft 68, the cam follower pin 77 moves in the cam groove 76, and the diff-lock shaft 68 is moved towards the right side. That is, the diff-lock fork 67, the diff-lock shifter 66, and the diff-lock pin 65 are moved towards the right side by the elastic force of the diff-lock spring 71.

When the brake pedal 12 is stepped on, in the case of the diff-lock pin 65 being opposed to the diff-lock notch 63a of the side gear 63, the forefront portion of the diff-lock pin 65 engages to the diff-lock notch 63a. On the other hand, when the brake pedal 12 is stepped on, in the case of the diff-lock pin 65 not being opposed to the diff-lock notch 63a of the side gear 63, the forefront surface of the diff-lock pin 65 abuts against the side surface of the side gear 63, the side gear 63 is rotate-driven under such condition allowing the diff-lock pin 65 to oppose to the diff-lock notch 63a, and the forefront portion of the diff-lock pin 65 engages to the diff-lock notch 63a.

Therefore, when the brake pedal 12 is stepped on, even in the case of the diff-lock pin 65 not being opposed to the diff-lock notch 63a, the brake operation shaft 52 can be turned by the buffer action (compression) of the diff-lock spring 71, the vehicular brake 41 can be properly operated by the brake operation plate 51, and right and left rear wheels 4 can be braked unfailingly. Moreover, when the brake pedal 12 is stepped on, the diff-lock pin 65 can be engaged to the diff-lock notch 63*a* by less than one rotation of the side gear 63, the differential mechanism 42 can be fixed forcibly, and right and left rear wheels 4 can be driven in diff-lock mode.

As a result, when the right and left rear wheels 4 that are driven via the differential mechanism 42 are braked, the improper braking of the right and left rear wheels 4 such as lacking of braking force of the right and left rear wheels 4 can be prevented, while the diff-lock pin 65 can be engaged smoothly to the diff-lock notch 63*a*, and the right and left rear wheels 4 can be shifted to diff-lock drive mode early.

Next, referring to the FIGS. 6, 9, and 10, the PTO drive structure that drives ground working machines such as the rotary cultivator 24 will be explained. There is provided the rear side PTO shaft 23 that is protruded rearward from the rear side surface of the mission case 17, and a front side PTO shaft 87 for transmitting PTO drive power forward. Working machines such as the rotary cultivator 24 that is located in the rear portion of the vehicular body 2 are driven by the rear side PTO shaft 23, while working machines such as a mowing machine that is located in front side of the vehicular body 2 or under surface side of the machine body such as the space between the front wheels 3 and the rear wheels 4 are driven by the front side PTO shaft 87.

Figure 9:
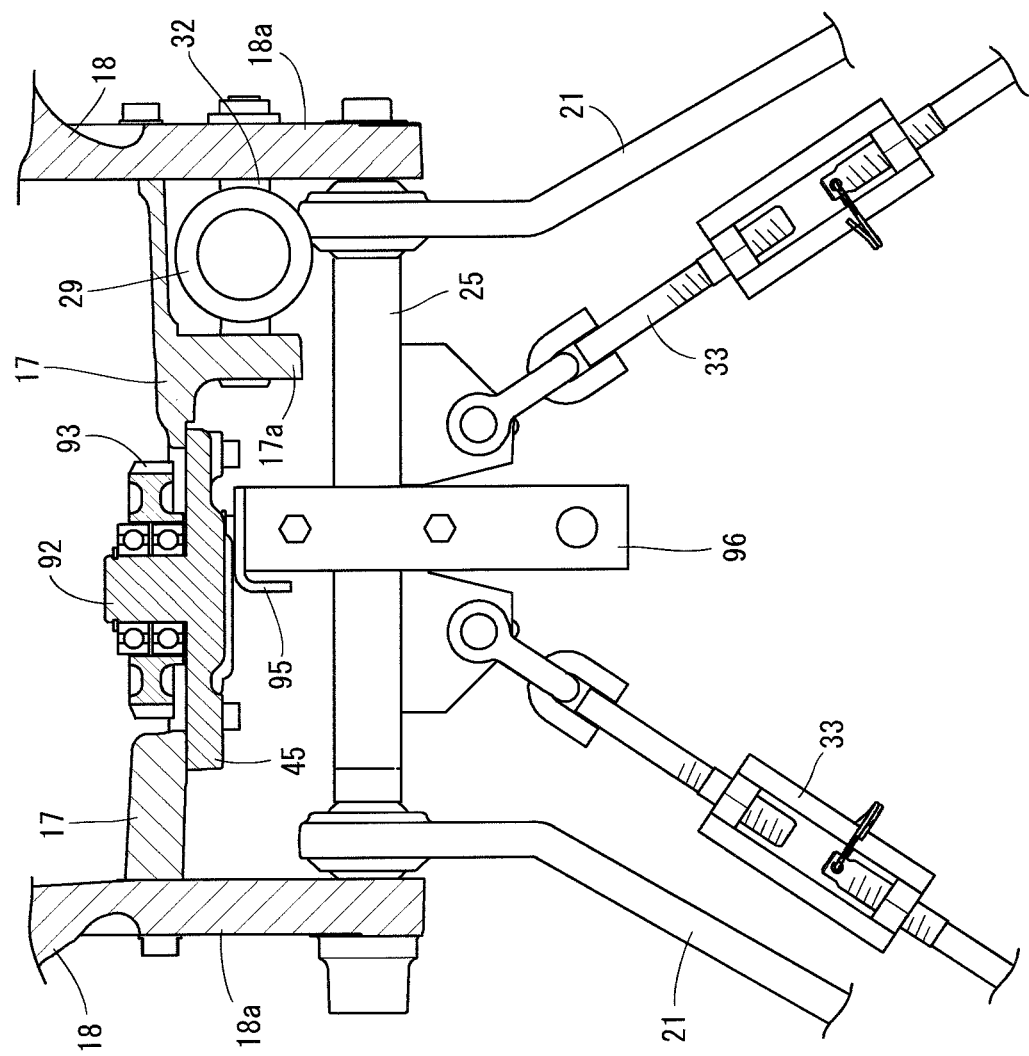
FIG. 9 is a cross-section plan view of the mission case.

As shown in the FIGS. 6, 9, and 10, there is provided a PTO clutch 88 and a PTO transmission shaft 89 that transmit power of the engine 5 without using the continuously variable transmission 46 nor the planetary gear mechanism 47. An idle shaft 90 that connects to the rear end side of the PTO transmission shaft 89 is provided. The rear end portion of the idle shaft 90 is pivotally supported to the rear surface side of the lid body 45, the front end side of the rear side PTO shaft 23 is connected to the idle shaft 90 via a deceleration gear 91, and power is transmitted from the rear end side of the rear side PTO shaft 23 to working machines such as the rotary cultivator 24. Furthermore, the deceleration gear 91 consistently meshes with an idle gear 90*a* that is formed on the idle shaft in an integrated fashion.

Moreover, a portion of the inner surface of the rear surface side of lid body 45 is protruded towards inner portion of the main body case 43, and a PTO transmission gear shaft 92 is formed in a unified manner on the inner surface of the rear surface side of lid body 45. A PTO transmission gear 93 is pivotally supported idly to the PTO transmission gear shaft 92. The PTO transmission gear 93 is consistently meshed with the deceleration gear 91. The rear end side of the front side PTO shaft 87 is pivotally supported on the under portion of the rear surface side of lid body 45, a front side PTO clutch 94 is provided on the rear end portion of the front side PTO shaft 87, and the rear end portion of the front side PTO shaft 87 is connected to the PTO transmission gear 93 via the front side PTO clutch 94 in a way that the rear end portion of the front side PTO shaft 87 can be put on and off.

According to the configurations mentioned above, the rear surface side of lid body 45 relative to the main body case 43 is operatable in attaching or detaching, with the rear side PTO shaft 23, the deceleration gear 91, and the PTO transmission gear 93 being assembled on the rear surface side of lid body 45. In order to easily attach the rear surface side of lid body 45 to the main body case 43, the only thing needed is nothing other than considering the engagement of the idle gear 90*a* and the deceleration gear 91. Moreover, the deceleration gear 91 and the PTO transmission gear 93 can be located planarly and compactly on the inner surface side of the rear surface side of lid body 45. Furthermore, a rear side hitch 96 is provided on the outside surface of the rear surface side of lid body 45 via a hitch bracket 95.

As shown in the FIGS. 1, 6 to 8, and 10, there is provided the working vehicle comprising the vehicular body 2 mounting the engine 5, the mission case 17 that transmits power of the engine 5 to the rear wheels 4 as right and left moving devices, the differential mechanism 42 located in the mission case 17, the diff-lock pin 65 that locks differential transmission motion of the differential mechanism 42, the diff-lock fork 67 as a lock pin disengagement operation mechanism that disengages the diff-lock pin 65, the brake pedal 12 and the vehicular brake 41 as braking operation tools that brake the right and left moving devices 4, the diff-lock spring 71 as a buffer means that connects the diff-lock fork 67 to the brake pedal 12, the cam mechanism 75 as a brake interlock means that connects the diff-lock pin 65 to the brake pedal 12 via the diff-lock spring 71, and the diff-lock spring 71 and the cam mechanism 75 are located in the mission case 17. Therefore, mud of a field etc. do not stick to the diff-lock fork 67, the diff-lock spring 71, or the cam mechanism 75, and for example, during cultivating work etc. in a wed paddy, there is no need of removing mud before the attached mud dries, and the maintenance work can be simplified.

As shown in the FIGS. 7 and 8, the brake interlock means is formed by the cam mechanism 75 that converts rotative force into slide force. Therefore, the cam mechanism 75 as the diff-lock fork 67, or the diff-lock spring 71, or the brake interlock means can be located compactly in the mission case 17, and the manufacturing cost of the mission case 17 can be reduced.

As shown in the FIGS. 6 to 8, and 10, the mission case 17 is formed with the main body case 43 in which the differential mechanism 42 is provided, and the rear surface side of lid body 45 that is fixed in a removable manner to the main body case 43. The single vehicular brake 41 and the brake operation shaft 52 as a brake operation shaft are located on one side of the differential mechanism 42, while the diff-lock pin 65 is pivotally supported inside of the mission case 17 via the diff-lock shaft 68, and the diff-lock pin 65 is supported in a slidable manner towards the shaft center line sirection of the diff-lock shaft 68. There is also provided the diff-lock spring 71 that diff-lock-actuates the diff-lock pin 65, and the lock release spring 72 that lock-releases the diff-lock pin 65. When the vehicular brake 41 is brake-actuated by the brake pedal 12, the diff-lock shaft 68 is moved towards the shaft center line direction by the cam mechanism 75, and the diff-lock pin 65 is engage-actuated by the elastic action of the diff-lock spring 71 against the lock release spring 72. Therefore, the vehicular brake 41 can be brake-actuated without delay, and at the same time, the diff-lock pin 65 can be engage-actuated smoothly. Moreover, the diff-lock fork 67 that connects the diff-lock shaft 68 to the brake operation shaft 52, or the diff-lock spring 71, or the cam mechanism 75 can be located compactly inside of the mission case 17 around the diff-lock shaft 68.

As shown in the FIGS. 6, 9, and 10, the PTO shafts 23 and 87 are located to the rear surface side of lid body 45, and the mission case 17 is formed by the main body case 43 in which the differential mechanism 42 is arranged, and by the front surface side of lid body 44 and the rear surface side of lid body 45 that are fixed in a detachable manner to the front surface side and the rear surface side of the main body case 43. A portion of the inner surface of the rear surface side of lid body 45 is protruded towards inner portion of the main body case 43, and a PTO transmission gear shaft 92 is formed in a unified manner on the inner surface of the rear surface side of lid body 45. The PTO transmission gear 93 is pivotally supported in a freely rotatable manner to the PTO transmission gear shaft 92. Therefore, in the case of the link mechanism 20 (top link, lower link) and the PTO shafts 23 and 87 being provided on the mission case 17, the rotary cultivator 24 (ground working machine) being mounted in the rear portion of a machine body in a liftable manner via the link mechanism 20, and the rotary cultivator 24 being driven by the PTO shafts 23 and 87, the PTO transmission gear 93 or the PTO transmission gear shaft 92 etc. that transmits rotative force to the PTO shafts 23 and 87 can be easily located inside of the mission case 17 via the rear surface side of lid body 45. Also, the diff-lock fork 67, or the diff-lock spring 71, or the cam mechanism 75, for example, can be easily located inside of the mission case 17 in order to avoid mud of a field to attach. The inner structure of the mission case 17 can be simplified, the mission case 17 can be downsized, and the manufacturing cost thereof can be reduced.

Next, referring to the FIGS. 11 to 14, the structure of the gearshift mechanism 60 will be explained. The gearshift mechanism 60 is comprised of a gearshift shaft 113 to which a pedal boss 112 is fitted that is located on the base end side of a pedal arm 111 of the forward pedal 60f, an intermediate link 117 that is connected to a pedal boss 115 that is located on the base end side of a pedal arm 114 of the reverse pedal 60b via a connection member 116, and a link shaft 119 to which a link boss 118 of the intermediate link 117 is fitted. Then, the gearshift shaft 113 is located in front, and the link shaft 119 is located at the back. The shaft direction of the gearshift shaft 113 and the link shaft 119 are located parallel to each other.

The pedal boss 112 of the forward pedal 60f is fixed to the gearshift shaft 113 and the pedal boss 112 is unable to rotate relatively to the gearshift shaft 113, while the pedal boas 115 located on the right side of the pedal boss 112 is able to rotate relatively to the gearshift shaft 113. In this case, for example, the pedal boss 112 is fixed to the gearshift shaft 113 by a roll pin. Moreover, the intermediate link 117 that connects to the reverse pedal 60b at the place lower than the link shaft 119 via the connection member 116 is able to rotate relatively to the link shaft 119. In this case, the reverse pedal 60b is constructed so that the location of the pedal boss 115 lies between the connection position of the connection member 116 and the pedal arm 114.

The forward pedal 60f is inflected at the installation position of the pedal boss 112, and the base end side of the forward pedal 60f is further extended from the pedal boss 112, forming the pedal arm 111 into the L-shape. Then, a bearing 120 as a cam slave member that is able to rotate relative to the pedal arm 111 is provided on the end portion of the pedal arm 111 that is extended from the pedal boss 112, on the surface of the pedal boss 115 side of the reverse pedal 60b. That is, the forward pedal 60f is constructed so that the location of the pedal boss 112 lies between the bearing 120 and the pedal arm 111.

Moreover, the front side surface of the intermediate link 117 forms a cam surface 121 abutting against the periphery side surface of the bearing 120, in order to push the bearing 120. In this case, the intermediate link 117 is constructed so that the location of the link boss 118 lies between the connection position of the connection member 116 and the cam surface 121. One end of a coil spring 122 whose the other end is connected to a rotating shaft 120a of the bearing 120 is connected to the upper end portion of the intermediate link 117, and the base end side of the pedal arm 111 of the forward pedal 60f is biased towards the intermediate link 117. In the intermediate link 117, the bearing 120 is provided on the opposite side of the pedal arm 111, relative to the pedal boss 115.

The gearshift mechanism 60 constructed like this is comprised of a oblong-shaped frame body 123 that pivotally supports the gearshift shaft 113 and the link shaft 119. That is, the frame body 123 fixes the link shaft 119 on the rearward of a left side surface plate 124 and on a right side surface plate 125, and the rotatable gearshift shaft 113 is pivotally supported on the front of the left side surface plate 124. Then, the left side end portion of the gearshift shaft 113 is protruded from the left side surface plate 124 towards the outside (left side) of the frame body 123, and connects to a link 126 that is connected to the gearshift rod 80 that slides in front and back direction.

Relative to the gearshift mechanism 60 that is constructed as explained above, when an operator steps on the forward pedal 60f, the gearshift shaft 113 rotates in the same direction as the forward pedal 60f. Therefore, by sliding forward the gearshift rod 80 that connects to the gearshift shaft 113 and the link 126, the shift shaft 78 rotates in the direction of forward movement, and the continuously variable transmission 46 is actuated in forward movement side. In this case, by the rotation of the forward pedal 60f, the bearing 120 is displaced towards rearward upper portion, pushing up the cam surface 121 of the intermediate link 117 against which the bearing 120 is abutted. Therefore, the intermediate link 117 rotates in the direction opposite to the rotation of the gearshift shaft 113, and the reverse pedal 60b that is connected to the intermediate link 117 via the connection member 116 also rotates in the same direction as the rotation of the intermediate link 117. That is, the reverse pedal 60b oscillates in the opposite side of the stepping direction of the forward pedal 60f (near side of an operator).

On the other hand, when an operator steps on the reverse pedal 60b, the intermediate link 117 that is connected to the reverse pedal 60b via the connection member 116 rotates in the same direction as the rotation of the reverse pedal 60b. By the rotation of this intermediate link 117, the cam surface 121 of the intermediate link 117 is displaced towards forward bottom side, pushing down the bearing 120. Therefore, the forward pedal 60f on which the bearing 120 is fixed rotates in the opposite direction of the rotational direction of the reverse pedal 60b and the intermediate link 117. That is, the forward pedal 60f oscillates in the opposite side of the stepping direction of the reverse pedal 60b (near side of an operator). Then, the gearshift shaft 113 to which the forward pedal 60f is fixed rotates in the same direction as the forward pedal 60f, and the gearshift rod 80 that is connected to this gearshift shaft 113 via the link 126 slides rearward. As a result, the shift shaft 78 rotates in the direction of reverse movement, the continuously variable transmission 46 is actuated rearward movement side, and the rotative power of the opposite direction is output.

Moreover, a shock absorber 127 that is connected to the link 126 at the connection position of the gearshift rod 80 and the link 126 is provided outside of the left side surface plate 124 of the frame body 123, parallel to the gearshift rod 80. By so doing, when the shift shaft. 78 returns to the neutral position, the forward pedal 60f and the reverse pedal 60b oscillate to the neutral position, via the gearshift rod 80 that is moved by the rotation of the gearshift arm 79, however, the oscillation can be softened using the shock absorber 127. Therefore, an operator's danger caused by a rapid return of the forward pedal 60f and the reverse pedal 60b can be prevented, and a rapid posture change of the tractor 1 caused by a rapid change of operating condition can be prevented.

Figure 11:
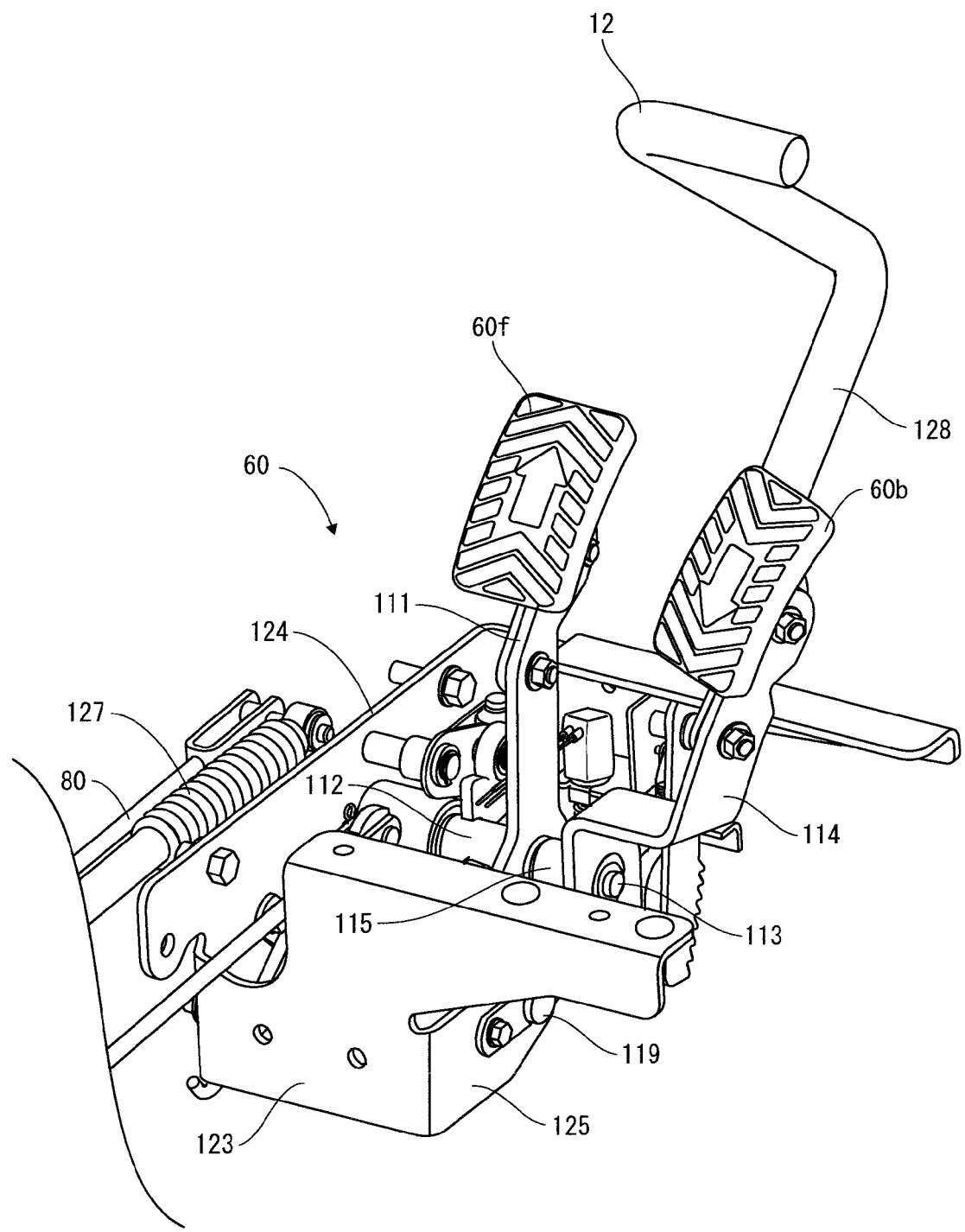
FIG. 11 is a diagrammatic perspective view of a gearshift mechanism seen from right backward.
Figure 12:
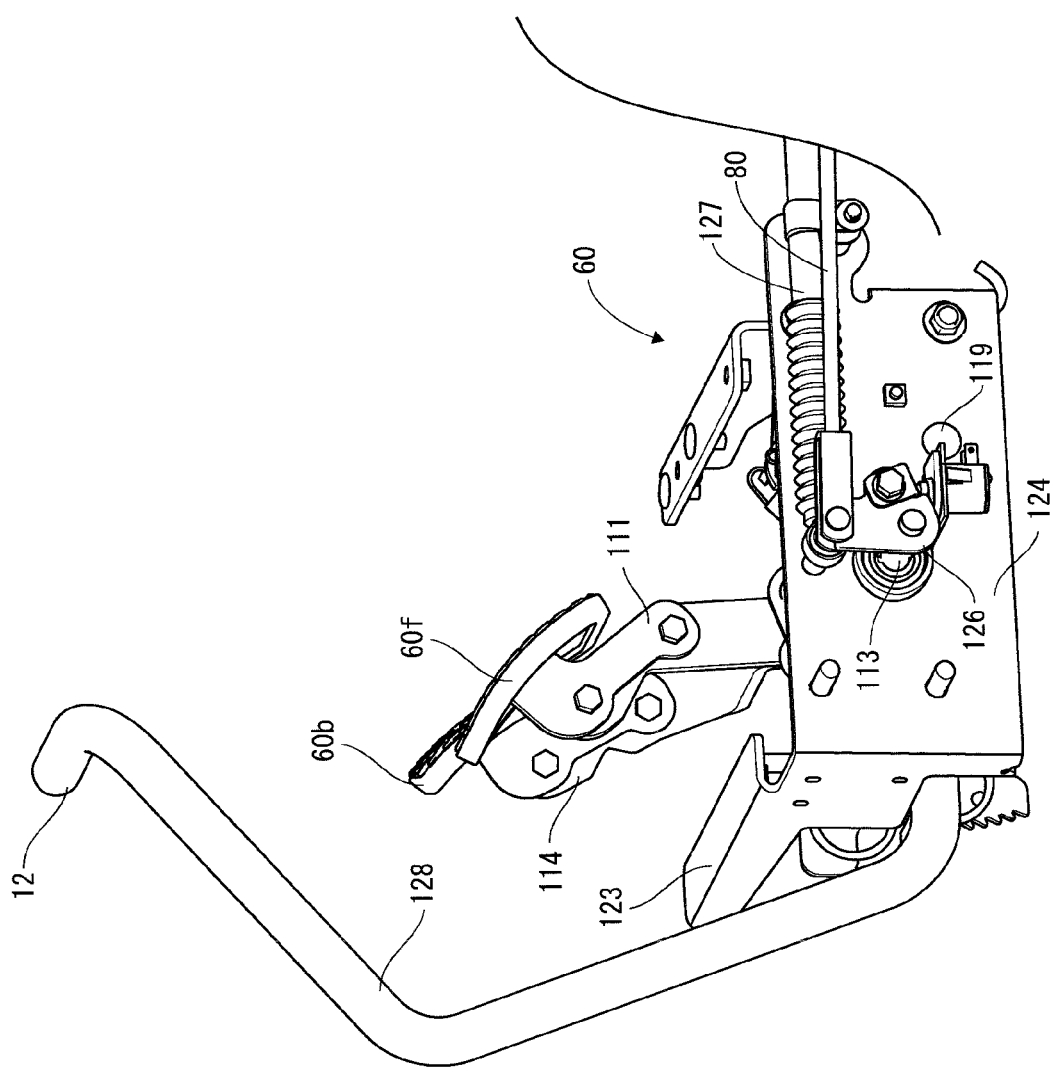
FIG. 12 is a diagrammatic perspective view of the gearshift mechanism seen from left front.
Figure 13:
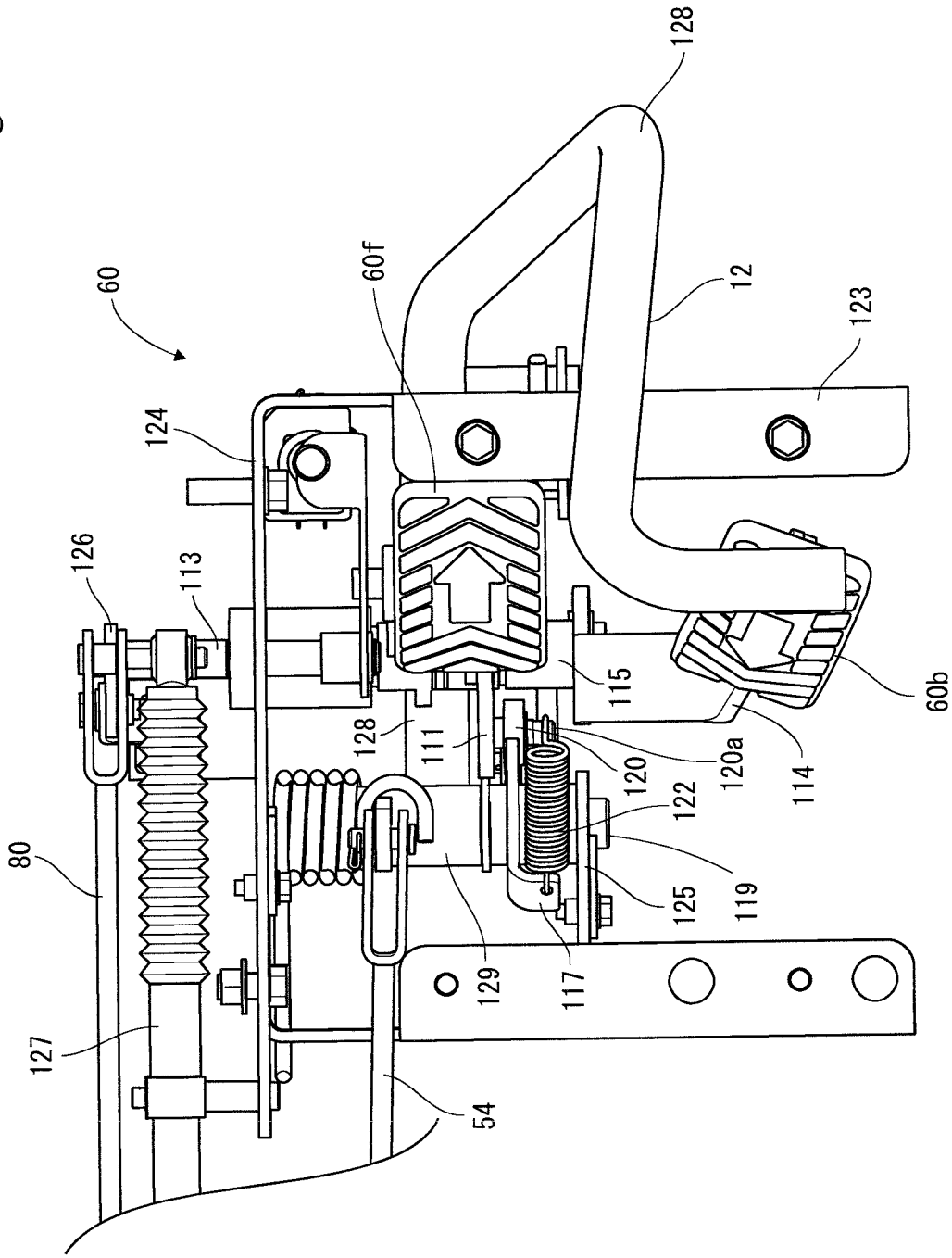
FIG. 13 is an upper view of the gearshift mechanism.
Figure 14:
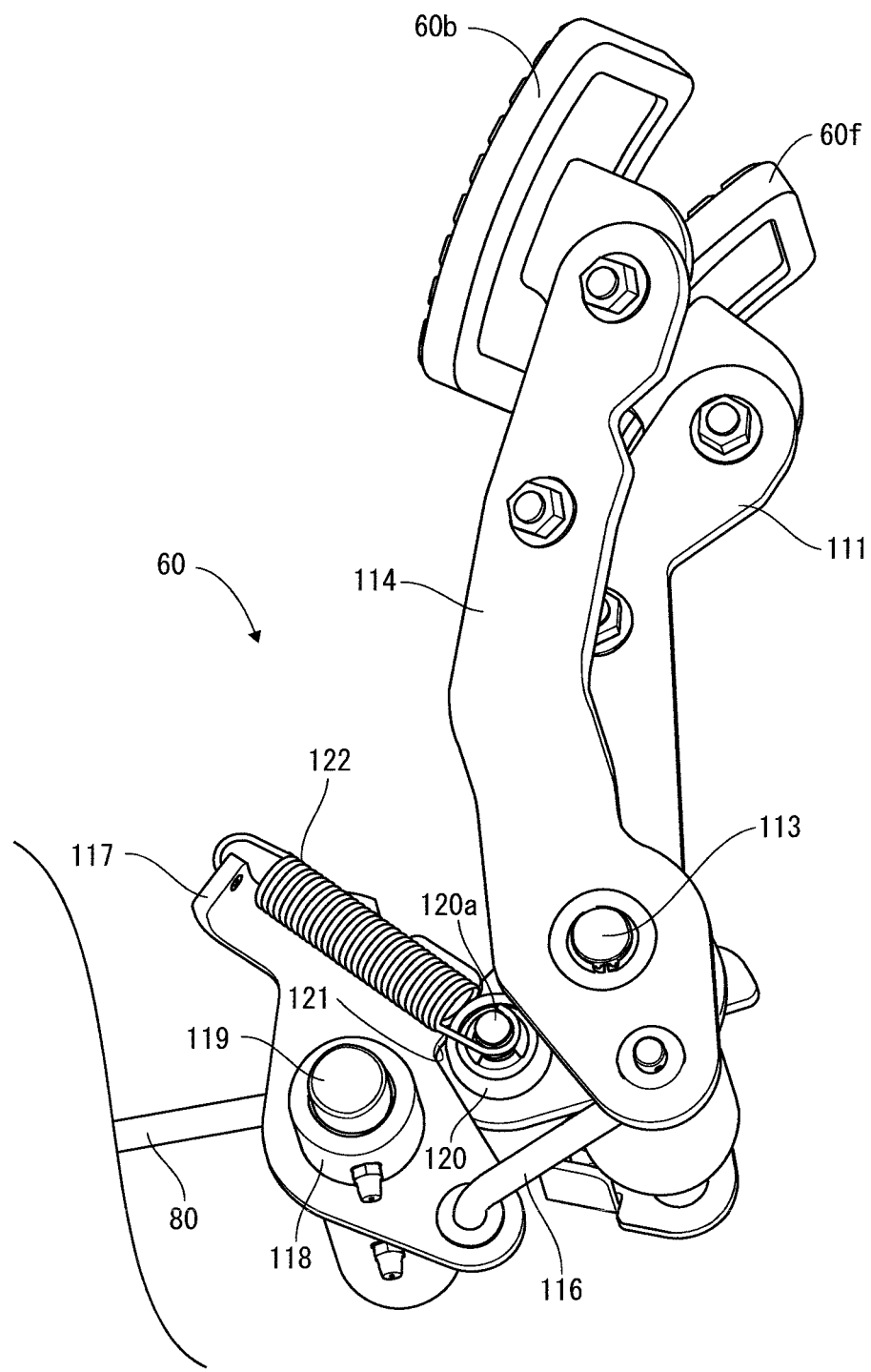
FIG. 14 is a diagrammatic perspective view of the gearshift mechanism that shows a framework of a forward pedal, reverse pedal, and an intermediate link in the gearshift mechanism seen from right underside.

As shown in the FIGS. 11 to 13, when the brake pedal 12 is equipped on the gearshift mechanism 60, the pedal arm 128 of the brake pedal 12 is provided in a way that the pedal arm 128 comes around from the front of the frame body 123 to the downside. Then, a pedal boss 129 that is provided on the base end side of the pedal arm 128 is fit to the link shaft 119, and connected to the brake operation rod 54. The pedal boss 129 of this brake pedal 12 is located on the left side of the link boss 118 of the intermediate link 117, and made possible to rotate relatively to the link shaft 119, as with the link boss 118.

Next, referring to the FIGS. 15 to 17, an inner structure of the front axle case 14 will be explained.

Generally, a front axle case of a tractor as a working vehicle is located forward and downward of a vehicular body (vehicle frame) via a center pin inserted in front and back direction on the upper portion of the right-left center of the front axle case (for example, see the FIG. 4 of JP 2004-210051), and is pivotally supported tiltably in right and left relative to the vehicular body. As in JP 2004-210051, in the case of pivotally supporting the front axle case in oscillatable fashion by a center pin, there is a need of fixing a bracket for supporting this center pin to a vehicular body. However, conventionally, since the bracket that supports this center pin is structured in a way that the bracket is equipped from beneath the vehicular body, the assembly work had been cumbersome and manufacturability had been limited. Moreover, since a center pin is a different body from a front axle case, there had been a need of inserting the center pin to the front axle case, and it had taken time to equip the front axle case.

The inner structure of the front axle case 14 described below can simplify the assembly process thereof. The front axle case 14 is comprised of a main body case 38 in which the front axle 35 and the differential mechanism 36 are located, a pivot shaft 39 that is located on upper portion of the main body case 38 in an integrated fashion, and a gear case 40 in which a bevel gear mechanism 37 is provided that transmits the rotation from the front axle 35 to the front wheels 3. The main body case 38 is an oblong in right and left direction and a hollow, the gear case 40 is fixed on both right and left end of the main body case 38, and the pivot shaft 39 is provided in the right-left center portion of the main body case 38.

The differential mechanism 36 is comprised of a link gear 56 that connects to a pinion gear 55 that is fixed to the forefront portion of a front wheel transmission shaft (not expressed with a figure), a frame body 57 that is fixed to the link gear 56, right and left side gears 58 in the frame body 57 that pivotally engages right and left front axles 35, and a pinion gear 59 that connects the right and left side gears 58. When the rotation transmitted through the front wheel transmission shaft (not expressed with a figure) is transmitted to the right and left front axles 35, the right and left front axles 35 differentially rotates because the differential mechanism 36 works.

The bevel gear mechanism 37 is comprised of a bevel gear 97 that is fixed to the opposite side end portion of the side gear 58 of the front axle 35, a bevel gear 98 that connects to the bevel gear 97 that pivotally engages the front axle 35, a king pin shaft 99 whose upper end the bevel gear 98 is fixed on, a bevel gear 100 that is fixed on the bottom end of the king pin shaft 99, and a bevel gear 101 that connects to the bevel gear 100 of the king pin shaft 99. As explained above, when the front axle 35 rotates via the differential mechanism 36, the front wheels 3 rotate that are pivotally supported to a rotating shaft of the bevel gear 101 (not expressed with a figure) via the bevel gear mechanism 37.

Regarding the front axle case 14 comprising the elements described above, the pivot shaft 39 is put between the front side support 15 that covers the front of the pivot shaft 39 and the rear side support 16 that covers rearward of the pivot shaft 39 at the front and back of the shaft direction. Then, the front side support 15 and the rear side support 16 are fixed on the vehicular body 2, the pivot shaft 39 is located rotatably relative to the front side support 15 and the rear side support 16, and the front axle case 14 can be tiltable in right and left relative to the vehicular body 2.

The front side support 15 is comprised of a support portion 151 that bridges right and left copper plate that construct the vehicular body 2, a bearing portion 152 that is fixed on the bottom of the center position of the support portion 151, and an adjustment screw 157 that is threaded into a screw hole 156 that is provided on the center position of a lid surface 153 that covers the front of the bearing portion 152. Then, the front side support 15 is constructed integrally with the front bumper 15a, by both end portions of the front bumper 15a that is formed by a U-shaped metal plate being fixed to both right and left end of the support portion 151.

On the other hand, the rear side support 16 is comprised of a support portion 161 that bridges right and left copper plate that construct the vehicular body 2, and a bearing portion 162 that is fixed on the bottom of the center position of the support portion 161. Then, regarding to the rear side support 16, both end of the support portion 161 are fixed to the right and left copper plates that construct the vehicular body 2, by using welding etc.

The front side support 15 and the rear side support 16, and their support portions 151 and 161 respectively can be constructed using a hollow chassis extended to right and left, formed with sheet-metal parts. In this case, an arc shaped notch portion 182 whose section is the same shape as the shape of the side surface of the bearing portion 152 and the bearing portion 162 is provided on copper plates 181 located front and back of the support portions 151 and 161, so that the bearing portion 152 and the bearing portion 162 are fitted on the bottom of the right-left center position of the support portions 151 and 161. Bottom copper plates 183 that cover from both right and left end of the notch portion to both end of the support portions 151 and 161 is provided on right and left, downside of the support portions 151 and 161. These right and left bottom copper plates 183 are fixed below the front and rear copper plates 181 using welding etc.

The front surface of the bearing portion 152 is covered with the lid surface 153 and the rear surface thereof is opened in cylindrical form, while the rear surface of the bearing portion 162 is covered with the lid surface 163 and the front surface thereof is opened in cylindrical form. Moreover, the bearing portion 152 and 162 are made double ring configuration that is comprised of inner rings 155 and 165 that slide along the inner periphery surface of outside chassis 154 and 164 that are covered with the lid surface 153 and 163. Then, the upper outer periphery surface side of the bearing portions 152 and 162 are fitted to the notch portion 182 that is provided below the copper plate 181 that is located front and back of the support portions 151 and 161, and are put between the bottom copper plates 183 of the support portions 151 and 161. By so doing, the bearing portions 152 and 162 are hanged by the support portions 151 and 161 respectively.

The front bumper 15a has through holes in which bolts 174 for fixing to the front of the vehicular body 2 are inserted, on right and left plate portion 171 on which the right and left end portion of the support portion 151 are fixed. On the other hand, the vehicular body 2 also has through holes in which the bolts are inserted, on the front of the right and left copper plates of the vehicular body 2. Therefore, the front side support 15 integral with a front bumper 15a is fixed on the vehicular body 2, by inserting the bolts 174 that are put through the through holes of the front bumper 15a and the vehicular body 2, in nuts 175.

Next, referring to the FIGS. 15 to 17, the assembly of the front axle case 14 to the vehicular body 2 will be explained. First of all, the rear side of the pivot shaft 39 of the front axle case 14 is inserted from the front side, relatively to the bearing portion 162 of the rear side support 16 that is fixed to the vehicular body 2. When the pivot shaft 39 is inserted from the front side open surface of the bearing portion 162, the front axle case 14 is assembled to the rear side support 16, so that the pivot shaft 39 rotates relatively to the bearing portion 162, by covering the pivot shaft 39 with the inner ring 165.

Moreover, a penetrated air hole 166 is provided on the lid surface 163 of the bearing portion 162. By this air hole 166, when the pivot shaft 39 is engaged to the bearing portion 162, the air in the space between the bearing portion 162 and the pivot shaft 39 can be released outside, which makes it easy to assemble the front axle case 14 to the rear side support 16.

Next, the bearing portion 152 of the front side support 15 is loosely fitted to the front portion of the pivot shaft 39 whose rear side is pivotally supported by the rear side support 16. That is, the front side support 15 is assembled to the front axle case 14 from the front of the vehicular body 2, as the front of the pivot shaft 39 is inserted to the rear side open surface of the bearing portion 152. In this case, the pivot shaft 39 is covered by the inner ring 155 of the bearing portion 152, so that the pivot shaft 39 rotates relatively to the bearing portion 152. Moreover, as with the bearing portion 162, an air hole can be provided on the bearing portion 152.

Then, the front side support 15 is fixed to the vehicular body 2, by fastening the nuts 175 and the bolts 174 that are penetrated through the through holes 172 and 173 of the front bumper 15a and the vehicular body 2. By so doing, since the front side support 15 is fixed to the vehicular body 2, the front axle case 14 that is put between the front side support 15 and the rear side support 16 is pivotally supported tiltably in right and left relative to the vehicular body 2.

Finally, the adjustment screw 157 is threaded into the screw hole 156 that is provided on the lid surface 153 of the bearing portion 152, against the front side support 15 that is fixed on the vehicular body 2. The adjustment screw 157 penetrates the lid surface 153 of the bearing portion 152, and abuts against the front surface of the pivot shaft 39 that is inserted in the bearing portion 152. In this case, the front-back position of the pivot shaft 39 is adjusted by adjusting the amount of insertion of the adjustment screw 157 in the bearing portion 152. By so doing, the pivot shaft 39 is put between the adjustment screw 157 and the lid surface 163 of the bearing portion 162, and front-back slight shifting of the front axle case 14 relative to the axial direction is deterred. Moreover, a concave portion for inserting the forefront of the adjustment screw 157 can be provided on the front surface of the pivot shaft 39, in order to insert the forefront of the adjustment screw 157 in this concave portion.

Figure 15:
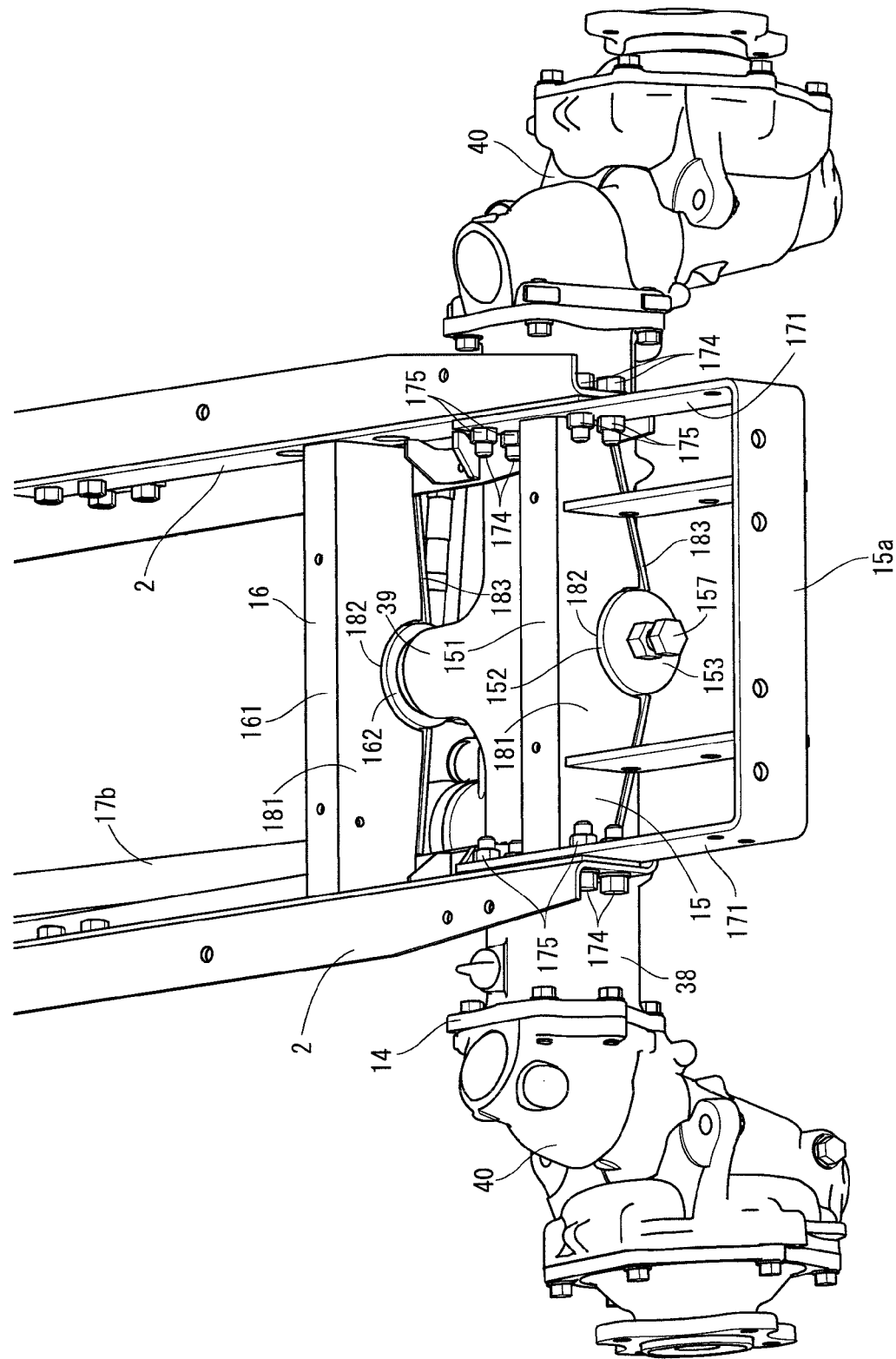
FIG. 15 is a diagrammatic perspective view of a surrounding area of a front axle case seen from upper front.
Figure 16:
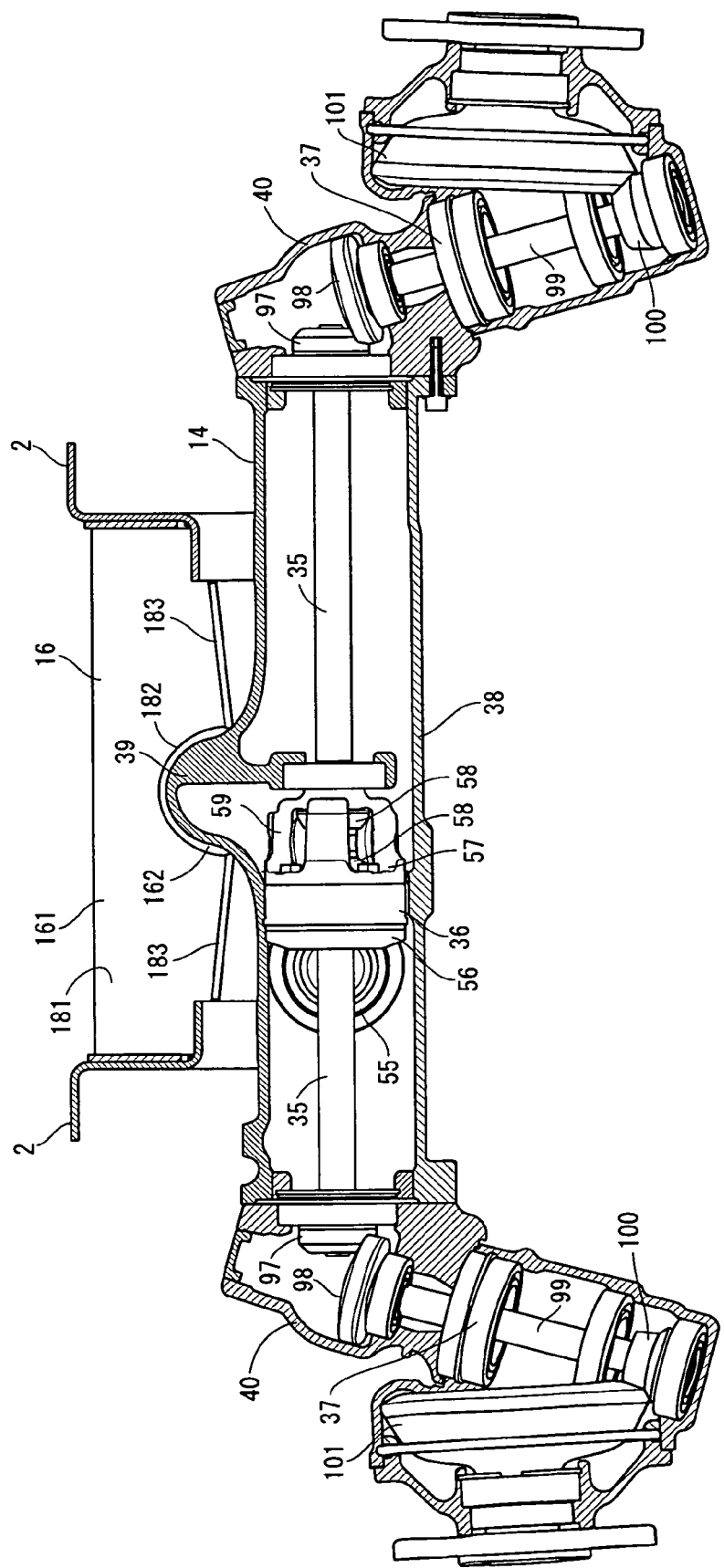
FIG. 16 is a cross-section view that shows an inner framework of the front axle case.
Figure 17:
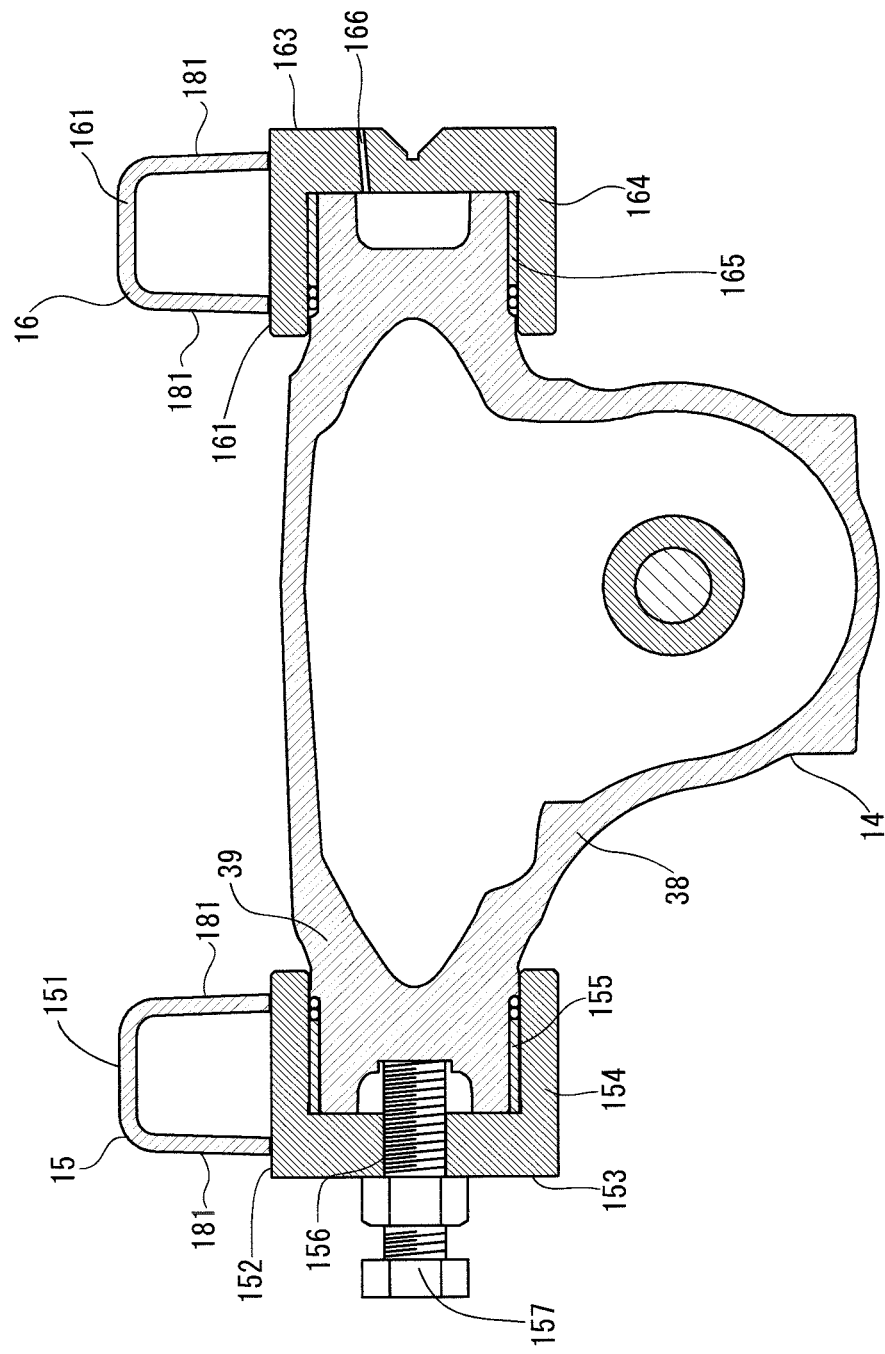
FIG. 17 is a cross-section view that shows a framework of the front axle case, a front side support, and a rear side support.

As is obvious from the explanation above and the FIGS. 15 to 17, there is provided the working vehicle 1 comprising the vehicular body 2 mounting the engine 5, the front axle case 14 that transmits the rotation based on the power of the engine 5 to the right and left front wheels 3, the pivot shaft 39 that is provided on the upper portion of the right-left center of the front axle case 14, and which enables the front axle case 14 to tilt right and left relatively to the vehicular body 2 having front-back direction as an axial direction, wherein the pivot shaft 39 is formed integrally with the front axle case 14. Therefore, a center pin for pivotally supporting the front axle case 14 that had been needed conventionally is unnecessary, reducing the assembly process of the front axle case 14, and the assembly process thereof can be simplified.

Moreover, as is obvious from the explanation above and the FIGS. 15 to 17, there is provided the front side support 15 comprising the bearing portion 152 in which the front side of the pivot shaft 39 is inserted, and the rear side support 16 comprising the bearing portion 162 in which the rear side of the pivot shaft 39 is inserted, wherein after the front axle case 14 is assembled on the rear side support 16 that is fixed to the vehicular body 2, the front side support 15 is assembled on the front axle case 14, the front side support 15 is fixed to the vehicular body 2, and the front axle case 14 is pivotally supported by the rear side support 16 and the front side support 15 that is fixed to the vehicular body 2. Therefore, cumbersome work in assembling the front axle case 14 can be omitted, and the work thereof can by simplified.

Furthermore, as is obvious from the explanation above and the FIGS. 15 to 17, there is further provided the adjustment screw 157 that is threaded into the front surface of the front side support 15, and the front-back position of the front axle case 14 is adjusted by the amount of insertion of the adjustment screw 157 in the front side support 15. Therefore, just by the adjustment of the amount of insertion of the adjustment screw 157, the front-back position of the front axle case 14 can be easily adjusted, and the front-back slight shifting of the front axle case 14 can also be deterred.

As is obvious from the explanation above and the FIGS. 15 to 17, there is further provided the front bumper 15a mounted in front of the vehicular body 2, wherein the front side support 15 is formed integrally with the front bumper 15a. Therefore, when the front axle case 14 that is assembled to the rear side support 16 is assembled to the front side support 15, the front side support 15 can be easily fixed by fixing the front bumper 15a to the vehicular body 2. In this case, the assembly work of the front side support 15 can be more simplified by using bolts and nuts to fix the front bumper 15a from the right and left of the vehicular body 2.

As shown in the explanation above and the FIGS. 15 to 17, at least one of the front side support 15 and the rear side support 16 has the air hole 166 that penetrates from the inside of the bearing portions 152 and 162 to the outside. Therefore, the workload to a worker can be reduced when inserting the pivot shaft 39 of the front axle case 14 to the bearing portions 152 and 162 on which the air hole 166 is provided, and the assembly of the pivot shaft 39 to the bearing portions 152 and 162 can be done easily.

REFERENCE SINGS LIST

2 Vehicular body
4 Rear wheels (Moving device)
5 Engine
12 Brake pedal (Braking operation tool)
14 Front axle case
15 Front side support
15a Front bumper
16 Rear side support
38 Main body case
39 Pivot shaft
40 Gear case
46 Continuously variable transmission
60 Gearshift mechanism
60f Forward pedal
60b Reverse pedal
78 Shift shaft
79 Gearshift arm
80 Gearshift rod
113 Gearshift shaft
116 Connection member 117 Intermediate link
119 Link shaft
120 Bearing
123 Frame body
126 Link
127 Shock absorber
151 Support portion
152 Bearing portion
157 Adjustment screw
161 Support portion
162 Bearing portion

The invention claimed is:

1. A gearshift mechanism comprising:
a first pedal varying forward direction of rotative power output from a continuously variable transmission that transmits power of an engine;
a second pedal varying reverse direction of rotative power output from the continuously variable transmission;
a gearshift shaft, to which fits a base end side of the second pedal that is located in a way that the second pedal can be operated in the same direction as the first pedal, being a rotating shaft of the first pedal whose base end side is fixed;
an intermediate link, which abuts against the base end side of the first pedal and rotates in a direction opposite to movement of the first pedal, being connected to the second pedal and rotating in the same direction as the second pedal;
a link shaft, which is located parallel to the gearshift shaft, fits to the intermediate link; and
a frame body pivotally supporting the gearshift shaft and the link shaft, wherein
an end portion of the gearshift shaft is connected to a link mechanism that is connected to the continuously variable transmission,
the second pedal and the intermediate link are relatively rotatable to the gearshift shaft and the link shaft respectively,
when the first pedal is operated, the gearshift shaft rotates in the same direction as the first pedal and the forward direction of rotative power from the continuously variable transmission is varied, and
when the second pedal is operated, the intermediate link rotates in the same direction as the second pedal, then the intermediate link pushes the base end side of the first pedal, then the first pedal rotates in a direction opposite to the second pedal along with the gearshift shaft, and then the reverse direction of rotative power from the continuously variable transmission is varied.

2. The gearshift mechanism according to claim 1, wherein the intermediate link has a cam face that pushes the first pedal, and
the first pedal abuts against the cam face of the intermediate link and has a bearing that rotates in accordance with the push of the cam face.

3. The gearshift mechanism according to claim 2 further comprising:
a shock absorber, which is located in parallel with the moving direction of the link mechanism, absorbing a load input to the gearshift shaft from the link mechanism.

4. A working vehicle comprising:
a vehicle body equipped with wheels for moving;
an engine mounted on the vehicular body;
a continuously variable transmission shifting power from the engine; and
a gearshift mechanism according to claim 2, wherein
the rotative power of the continuously variable transmission is varied by operation of the gearshift mechanism.

5. The gearshift mechanism according to claim 1 further comprising:
a shock absorber, which is located in parallel with the moving direction of the link mechanism, absorbing a load input to the gearshift shaft from the link mechanism.

6. A working vehicle comprising:
a vehicle body equipped with wheels for moving;
an engine mounted on the vehicular body;
a continuously variable transmission shifting power from the engine; and
a gearshift mechanism according to claim 5, wherein
the rotative power of the continuously variable transmission is varied by operation of the gearshift mechanism.

7. A working vehicle comprising:
a vehicle body equipped with wheels for moving;
an engine mounted on the vehicular body;
a continuously variable transmission shifting power from the engine; and
a gearshift mechanism according to claim 1, wherein
the rotative power of the continuously variable transmission is varied by operation of the gearshift mechanism.

* * * * *